United States Patent [19]

Riebel et al.

[11] Patent Number: 5,635,123
[45] Date of Patent: Jun. 3, 1997

[54] BIOCOMPOSITE MATERIAL AND METHOD OF MAKING

[75] Inventors: Michael J. Riebel, Mankato; Paul L. Torgusen, New Ulm; Kenneth D. Roos, Nicollet; Donald E. Anderson, Northfield; Carl Gruber, Le Seur, all of Minn.

[73] Assignee: Phenix Biocomposites, Inc., St. Peter, Minn.

[21] Appl. No.: 487,498

[22] Filed: Jun. 7, 1995

Related U.S. Application Data

[63] Continuation of Ser. No. 258,187, Jun. 10, 1994, and a continuation-in-part of Ser. No. 211,567, filed as PCT/US93/07538 Aug. 11, 1993, which is a continuation-in-part of Ser. No. 928,965, Aug. 11, 1992, abandoned.

[51] Int. Cl.$^6$ ............................. B29C 67/24; B29C 67/00
[52] U.S. Cl. ..................... 264/125; 264/115; 264/123; 264/124; 156/336; 156/62.2; 428/402; 428/533
[58] Field of Search ..................................... 156/328, 336, 156/62.2; 264/109, 115, 120, 128, 245, 73, 176.1, 207, 123, 124, 125; 428/537.5, 903.3, 533, 402

[56] References Cited

U.S. PATENT DOCUMENTS

| | | |
|---|---|---|
| 906,043 | 12/1908 | Malcolm . |
| 1,689,732 | 10/1928 | Laucks et al. . |

(List continued on next page.)

FOREIGN PATENT DOCUMENTS

| | | |
|---|---|---|
| 36603/84 | 12/1984 | Australia . |
| 2718622 | 11/1978 | Germany . |
| 3545001 | 7/1986 | Germany . |
| 62-007503 | 1/1987 | Japan . |
| 4219203 | 8/1992 | Japan . |
| 832227 | 4/1960 | United Kingdom . |
| 2199333 | 7/1988 | United Kingdom . |
| WO94/04360 | 3/1994 | WIPO . |

OTHER PUBLICATIONS

D. E. Anderson, "Resinvigorating the Rural Economy: A Case Study from 'Mollyboard' to 'NewStone' to 'Environ'", *Enviro/Economic Sustainability Workshop*, pp. 53–55, Dec. 1993.

J. Anderson et al., "Farm Program Helps Japanese", *San Antonio Express News*, Jun. 9, 1993.

J. Anderson et al., "USDA Promoting New Uses for Farm Products", *United Feature Syndicate*, Jun. 9, 1993.

A. Baldan, "Binders from Soy Flour", *Chemical Abstracts*, 106, No. 24, Abstract No. 198031, (Jun. 5, 1987 according to Int'l Search Report attached herewith.

A. Behling, "Soybean–Based Building Material Creates Excitement", *Soybean Digest*, p. 28, Aug./Sep. 1993.

J. Bevis, "Making the Mold", *Minnesota Calls*, p. 6, Mar./Apr. 1994.

Black et al., "NewStone May Be A Treasure For Soybean Growers", *Farming Today*, 10, cover page and p. 15, 1992.

A.J. Brandel, "Entrepreneur Combines Environmental and Agricultural Concerns to Develop New Product", *Highlights*, Oct. 1992.

A.J. Brandel, "Soybean–based New Stone Cut From Leafy Mold", *Agri News*, Aug. 20, 1992.

(List continued on next page.)

*Primary Examiner*—David A. Simmons
*Assistant Examiner*—M. Curtis Mayes
*Attorney, Agent, or Firm*—Mueting, Raasch, Gebhardt & Schwappach, P.A.

[57] ABSTRACT

Fiber-reinforced protein-based biocomposite particulate material containing a legume-based thermosetting resin and cellulosic material, and rigid biocomposite pressure-formed materials produced therefrom, are provided. The particulate material and resultant pressure-formed materials contain the legume-based resin and fibrous cellulosic material in amounts such that the ratio of cellulose solids to resin solids is about 0.8:1.0 to about 1.5:1.0. Particularly preferred pressure-formed materials also include a secondary thermosetting binder, such as an isocyanate.

20 Claims, 6 Drawing Sheets

U.S. PATENT DOCUMENTS

| | | |
|---|---|---|
| 1,724,695 | 8/1929 | Davidson et al. |
| 1,777,157 | 9/1930 | Biddle . |
| 1,777,158 | 9/1930 | Biddle . |
| 1,777,159 | 9/1930 | Biddle . |
| 1,777,160 | 9/1930 | Biddle . |
| 1,777,161 | 9/1930 | Biddle . |
| 1,777,162 | 9/1930 | Biddle . |
| 1,864,333 | 6/1932 | Aldrich . |
| 1,892,486 | 12/1932 | Dunham . |
| 1,951,940 | 3/1934 | Manson ................................ 92/54 |
| 1,976,435 | 10/1934 | Cone et al. ........................... 87/17 |
| 2,026,765 | 1/1936 | Woodford ............................ 92/54 |
| 2,105,593 | 1/1938 | Hatton ................................. 92/57 |
| 2,156,308 | 5/1939 | Schuh .................................. 92/21 |
| 2,156,311 | 5/1939 | Schuh .................................. 92/21 |
| 2,178,566 | 11/1939 | Dike et al. ........................... 144/309 |
| 2,580,391 | 1/1952 | Babcock et al. ..................... 154/141 |
| 2,699,097 | 1/1955 | Binkley ............................... 92/55 |
| 2,754,240 | 7/1956 | Kinney ................................ 154/141 |
| 2,788,305 | 4/1957 | Sheeran .............................. 154/138 |
| 2,810,657 | 10/1957 | Preusser ............................. 106/154 |
| 2,894,847 | 7/1959 | Wright ................................. 106/79 |
| 2,963,454 | 12/1960 | Drugge et al. ...................... 260/8 |
| 3,070,485 | 12/1962 | Strickman .......................... 162/135 |
| 3,444,109 | 5/1969 | Golick et al. ....................... 260/6 |
| 3,456,355 | 7/1969 | Cumming et al. .................. 34/1 |
| 3,667,880 | 6/1972 | Malet et al. ........................ 425/3 |
| 3,677,850 | 7/1972 | Holt et al. ........................... 156/62.2 |
| 3,684,641 | 8/1972 | Murphy ............................... 161/129 |
| 3,713,881 | 1/1973 | Akiyama et al. ................... 117/155 |
| 3,718,536 | 2/1973 | Downs et al. ...................... 161/168 |
| 3,736,221 | 5/1973 | Evers .................................. 161/170 |
| 3,769,116 | 10/1973 | Champeau .......................... 156/62.8 |
| 3,779,860 | 12/1973 | Oshida et al. ...................... 162/129 |
| 3,819,456 | 6/1974 | Enfield ................................ 161/7 |
| 3,841,885 | 10/1974 | Jakel ................................... 106/93 |
| 3,895,998 | 7/1975 | Haywood et al. .................. 162/100 |
| 3,927,235 | 12/1975 | Chow .................................. 428/302 |
| 3,984,275 | 10/1976 | Hofmann et al. .................. 156/328 |
| 4,012,561 | 3/1977 | Doughty et al. ................... 428/531 |
| 4,018,642 | 4/1977 | Pike et al. .......................... 156/272 |
| 4,111,730 | 9/1978 | Balatinecz .......................... 156/62.2 |
| 4,148,952 | 4/1979 | Nelson et al. ...................... 428/2 |
| 4,184,311 | 1/1980 | Rood ................................... 53/434 |
| 4,216,179 | 8/1980 | Lamberts et al. .................. 264/25 |
| 4,234,658 | 11/1980 | Chow .................................. 428/403 |
| 4,300,322 | 11/1981 | Clark .................................. 52/406 |
| 4,339,363 | 7/1982 | Nakagima ........................... 524/34 |
| 4,350,567 | 9/1982 | Moorehead et al. ............... 162/145 |
| 4,356,060 | 10/1982 | Neckermann et al. ............. 162/181.6 |
| 4,373,955 | 2/1983 | Bouchard et al. .................. 106/88 |
| 4,377,440 | 3/1983 | Gasland .............................. 162/101 |
| 4,382,847 | 5/1983 | Akesson et al. .................... 204/159.12 |
| 4,407,697 | 10/1983 | Sadler et al. ....................... 162/137 |
| 4,468,336 | 8/1984 | Smith .................................. 252/62 |
| 4,497,662 | 2/1985 | Chisholm et al. .................. 106/92 |
| 4,530,196 | 7/1985 | O'Bryan ............................. 52/747 |
| 4,543,159 | 9/1985 | Johnson et al. .................... 162/164.1 |
| 4,608,089 | 8/1986 | Gale et al. .......................... 106/90 |
| 4,624,383 | 11/1986 | Moore ................................ 220/23.4 |
| 4,693,749 | 9/1987 | Gale .................................... 106/99 |
| 4,695,695 | 9/1987 | Meek et al. ......................... 219/10.55 |
| 4,708,623 | 11/1987 | Aoki et al. .......................... 425/202 |
| 4,710,309 | 12/1987 | Miller ................................. 252/62 |
| 4,722,854 | 2/1988 | Cope ................................... 427/280 |
| 4,769,109 | 9/1988 | Tellvik et al. ...................... 162/123 |
| 4,810,445 | 3/1989 | Lamb, Sr. et al. ................. 264/112 |
| 4,812,492 | 3/1989 | Eckes et al. ........................ 523/351 |
| 4,814,012 | 3/1989 | Paul et al. ........................... 106/38.51 |
| 4,840,817 | 6/1989 | Murakami et al. ................. 427/45.1 |
| 4,899,513 | 2/1990 | Morris ................................ 52/511 |
| 4,937,021 | 6/1990 | Danforth et al. ................... 264/26 |
| 4,957,668 | 9/1990 | Plackard et al. ................... 264/23 |
| 4,963,603 | 10/1990 | Felegi, Jr. et al. ................. 524/13 |
| 4,994,113 | 2/1991 | Helmstetter ........................ 106/618 |
| 4,994,148 | 2/1991 | Shetka ................................ 162/227 |
| 5,011,741 | 4/1991 | Hoffman ............................. 428/503.1 |
| 5,064,504 | 11/1991 | Shetka ................................ 162/396 |
| 5,075,057 | 12/1991 | Hoedl .................................. 264/115 |
| 5,075,131 | 12/1991 | Hattori et al. ...................... 427/45.1 |
| 5,093,051 | 3/1992 | Reiniger ............................. 264/294 |
| 5,134,023 | 7/1992 | Hsu ..................................... 428/288 |
| 5,229,439 | 7/1993 | Gueret ................................ 524/13 |
| 5,244,942 | 9/1993 | Hover et al. ........................ 523/171 |
| 5,280,051 | 1/1994 | Traverso et al. ................... 523/171 |
| 5,318,736 | 6/1994 | Lepori et al. ....................... 264/126 |

OTHER PUBLICATIONS

J. Brissett et al., "Sixth Grader's Idea Sparks Company Backed By Millions", *Corporate Report Minnesota*, pp. 22–23, Aug. 1993.

R.S. Burnett, "Nature and Evaluation of Protein Modification" in *Soybeans and Soybean Products;* Interscience Publishers, Inc.: New York, NY; pp. 1004–1011; 1951.

R.S. Burnett, "Soybean Flour Paper–Coating Adhesives" in *Soybeans and Soybean Products;* Interscience Publishers, Inc.: New York, NY; pp. 1024–1025; 1951.

J. L. Carter, "New Stone Building Material of the Future", *Herald–Dispatch*, p. 4A Mar. 4, 1993.

N. Chatterjee, "Plastic Composition", *Chemical Abstracts*, 46, No. 13, Col. 7821, Jan. 1952.

I. Clepper, "Technology, Imagination Enable Inventors to Find New Building Materials From Old Sources", *Automated Builder*, pp. 24–25, Jan. 1993.

M. DeGezelle, "Is It Possible To Recycle Paper Into a Usable Building Material?", poster presented at St. Joseph–St. John's School, Mankato, MN, pp. 1–5, Mar. 7, 1991.

M. DiChristina (Ed.), "Paper Bricks", *Popular Science*, pp. 46–47 (Feb. 1992).

L. Eastlund, "Friendly Invention — Teacher Develops New Building Product", *Daily News*, Feb. 3, 1993.

P.B. Elliott, "Mankato Businessman Hawks Phenix Product At D.C. Expo", *Mankato Free Press*, Mar. 18, 1994.

L. Hamilton, "Soybeans and Old Newspapers Form A Wood Substitute Called Environ", *FFA New Horizons*, p 8, Sep./Oct. 1993.

M. Holmberg, "A Thing of Beauty — This New Building Product Looks Like Real Granite, But Actually Is Made From Soybeans", *Soybean Grower, Planting*, 1994.

A.A. Horvath, "Adhesive and Sizing Materials" in *The Soybean Industry;* The Chemical Publishing Co.: New York; Chapter XIX; pp. 183–188 (1938).

D. Keller, "Romancing the NewStone", *U.S. News*, Jan. 1993.

B. Kleinjan, "Soybeans, Newspapers & Environ", p. 14, Document was included in Phenix Composites, Inc. Business Plan book dated Sep. 23, 1993.

A.L. Lambuth, "Soybean Glues" in *Handbook of Adhesives;* 2d. Ed., pp. 172–180; 1962.

R. Larson, "A Bright Future — Soybean–Related Inventions Could Be A Boon", *Agriculture Today*, Mar. 24, 1993.

S. Menton, "Girl Recycles Old Papers Into A Strong New Board", *Mankato Free Press*, Jun. 14, 1991.

M. Morris, "A House for All Reasons", *Popular Science*, pp. 66–71, 102–106 (Mar. 1993).

D. Muhm, "Mix Soybeans, Old Paper: What Do You Get?", *Des Moines Register*, Aug. 1992.

T. Nhan, "'NewStone' is Touted as Building Material", *The St. Paul Pioneer Press*, Aug. 16, 1992.

T. Nhan, "A Desk Made Out Of Soybeans?", *St. Paul Pioneer Press*, Aug. 14, 1992.

J. Olson et al., "Building Materials from Soybeans and Waste Paper", *AG Innovation News*, p. 12, Oct. 1992.

N. Pignatello, "Common Materials Evolve Into New Products", *Fedgazette*, p. 16, Apr. 1993.

Albany Plylock, *The Timberman*, pp. 35–38 (Jul. 1941).

J. Sailor, "Part Soybeans, Part Magic . . . Environ May Be the Wave of the Future", *St. Peter Herald*, Sep. 9, 1993.

S. Schmickle, "'NewStone' Could Be More Than A Hill of Beans", *Star Tribune*, Aug. 13, 1992.

K. Schulz, "Soybeans are Turning to Stone", *The Land*, 17, p. 2, Jan. 29, 1993.

F.R. Senti et al., "Fibrous From Globular Proteins", *J. Phys. Chem.*, 49, pp. 192–210 (1945).

P.J. Skerrett, "Wood Replacement Uses Trash", *Popular Science*, p. 44, (Feb. 1993).

J. Spear, "Making a Breakthrough . . . Paper, Soybeans Turned Into Building Blocks", *Mankato Free Press*, Dec. 1992.

J. Spear, "Company Gets $1 Million Loan to Begin Production" in *Free Press*, Apr. 21, 1993.

B.C.H. Sun et al., "Effect of Polyisocyanate Level on Physical Properties of Wood Fiber Composite Materials", *Forest Products Journal*, 44(4), pp. 53–58 (Apr. 1994).

A.T. Ulness, "Interior Products", *Building Products*, pp. 40–41, Summer, 1994.

"A New Building Material Made from Soybeans and Wastepaper", *National Soybean Checkoff — Facts and Figures*, 1, Sep. 1992.

ASTM Designation: E–84–91a, "Standard Test Method for Surface Burning Characteristics of Building Materials", pp. 300–314, Oct. 1991.

ASTM Designation: D 1037–91: "Standard Test Methods for Evaluating Properties of Wood–Based Fiber and Particle Panel Materials", pp. 170–199, Dec. 1991.

"Another New Use For Soybeans", *The Soy Bin*, Sep. 1992.

"Builders to Test Material Made of Newspaper, Soybeans", *Business Farm*, p. E1, Feb. 7, 1993.

"Building With Soybeans", *The Farmer*, Sep. 8, 1992.

"Cash Is King in Mankato/North Mankato", *Minnesota Ventures*, 42–50, Jun. 1993.

Cutler–Magner Company Material Safety Data Sheet — Product Name: Rockport Hydrated Lime; pp. 1–3; Mar. 6, 1991.

"Environ: Like Wood, Only Better", *LaCross Tribune*, p. C–2, Sep. 8, 1993.

"Granite–Look 'Environ'", *Building Material Retailer*, p. NW23, Jun. 1994.

H.B. Fuller Company Technical Information bulletin; Waterproofing Additive for Corrugating Adhesives, with Low Free Formaldehyde and Good Viscosity Stability; pp. 1–5; Mar. 19, 1992.

H.B. Fuller Company Material Safety Data Sheet — Product Description: Resin Emulsion in Water; pp. 1–5; Oct. 14, 1993.

Honeymead Products Company Material Safety Data Sheet — Product Name: Soybean Flour, Flakes, High Energy Meal; Dec. 11, 1992.

"Minnesota Pilot Plant to Manufacture New Soy–Based Product", Aug. 12, 1992.

"Minnesota: Soybeans And Paper Make Outstanding Building Materials At Phenix Composites, Inc.", *AG Industrial Materials and Products*, p. 9, Sep. 1993.

"NewStone Creating New Opportunities", *Raymond News*, Aug. 19, 1992.

NewStone ad in "Week in Review" *Successful Business*, Aug. 24, 1992.

Occidental Chemical Company Material Safety Data Sheet — Product Name: 45% Caustic Potash–Commercial Grade; pp. 1–9; May 30, 1989.

PQ Corporation Material Safety Data Sheet — Product Name: Soybean Glue Component; pp. 1–2; Oct. 27, 1988.

Phenix Composites, *Connect Magazine*, pp. 10–13, Apr. 1994.

Phenix Composites, Inc., *Star Tribune*, Apr. 21, 1993.

Phenix Composites, Inc., *Pioneer Press*, Apr. 21, 1993.

"Phenix Makes Woodlike Composite Out Of Recycled Paper and Soybean Waste", *Industrial Bioprocessing*, p. 3, Oct. 1992.

"Phenix to Offer Granite–Like Composite", *Furniture/Today*, Jun. 14, 1993.

SCM Glidco Organics Material Safety Data Sheet — Product Name: Pine Oil; pp. 1–3; Apr. 2, 1992.

Soybean Digest Blue Book; American Soybean Association: Hudson, Iowa; pp. 126–127, Mar. 1974.

"Soybean Farmers Push Quasi–Plastic Building Material", *The Cedar Rapids Gazette*, Aug. 14, 1992.

"Soybeans and Old Newspapers Never Looked So Good", *Furniture Design & Manufacturing*, Jan. 1994.

"Soybeans & Recycled Papers Create New Environ", document was included in Phenix Composites, Inc. Business Plan book dated Sep. 23, 1993.

"Those Beans Are As Strong As Timber", *Hoosier Farmer*, p. 25, Sep./Oct. 1993.

"To Recycle or Not to Recycle", *Reused News*, p. 3, 1, 1994.

International Search Report, dated Dec. 2, 1994.

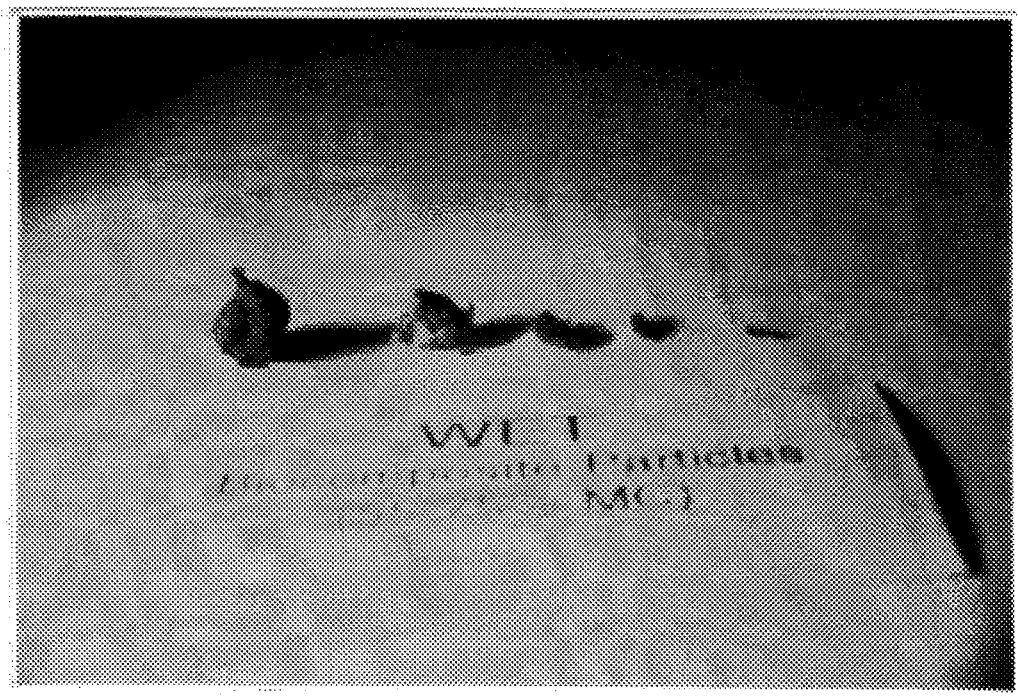
FIG. IA
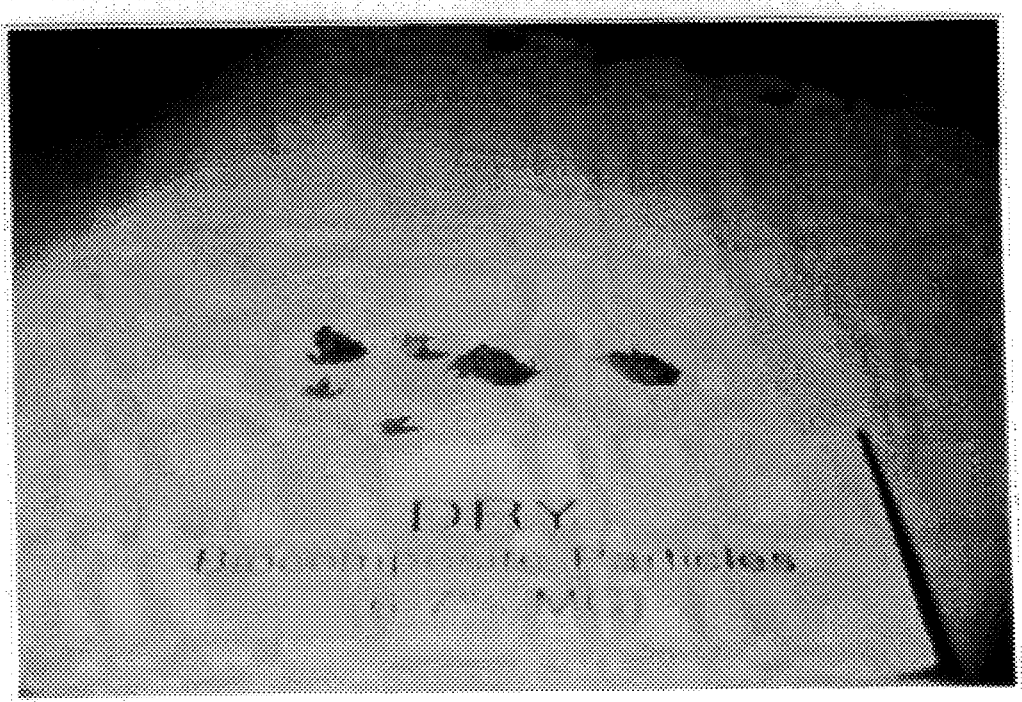
FIG. IB

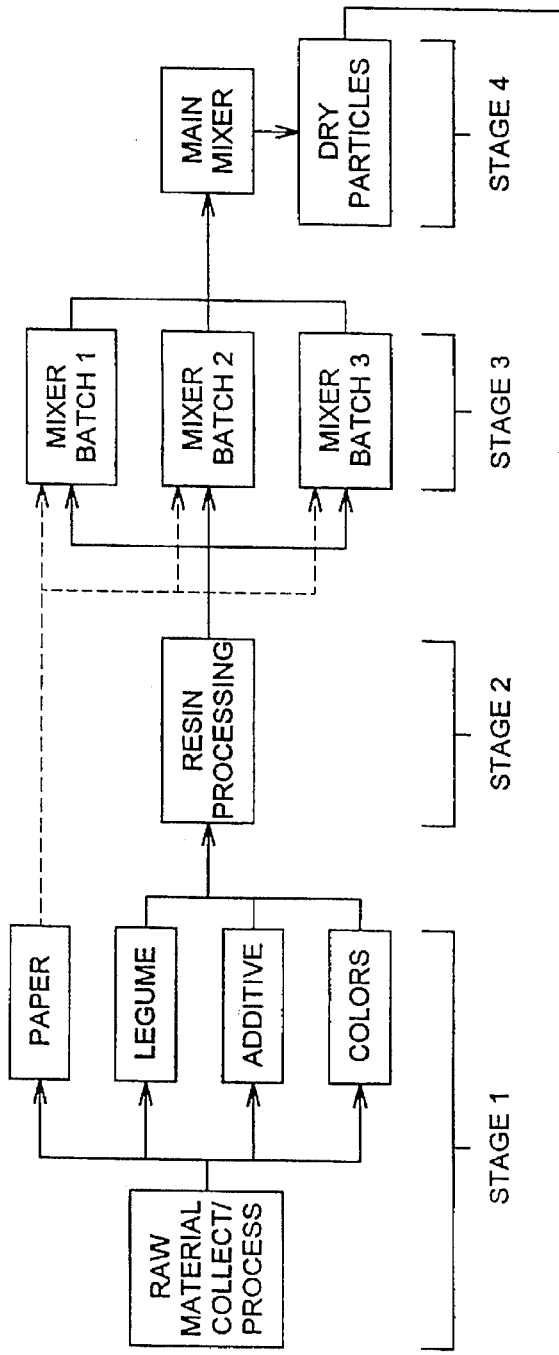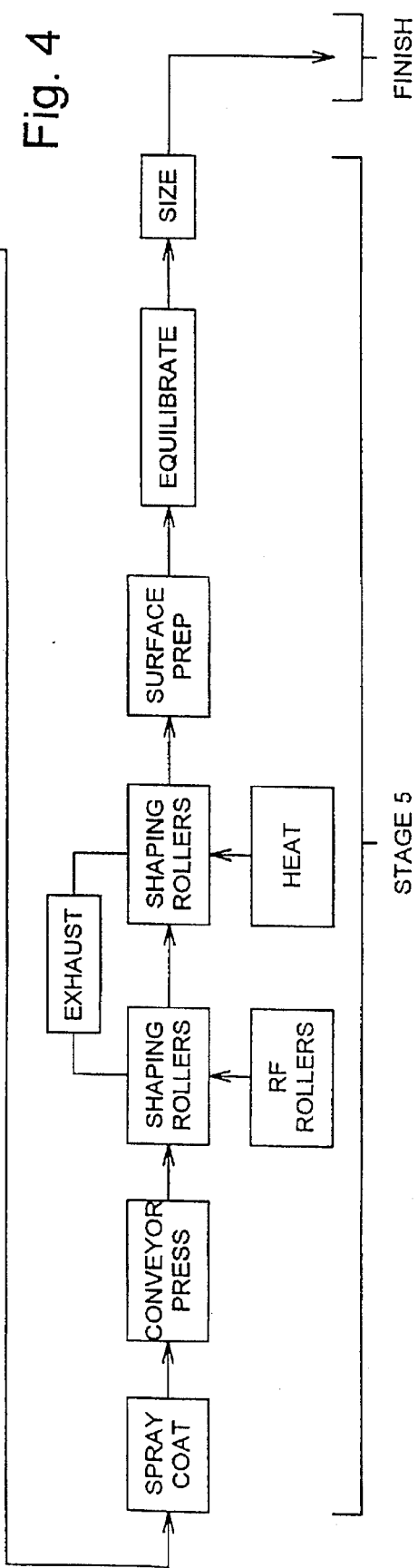
Fig. 4

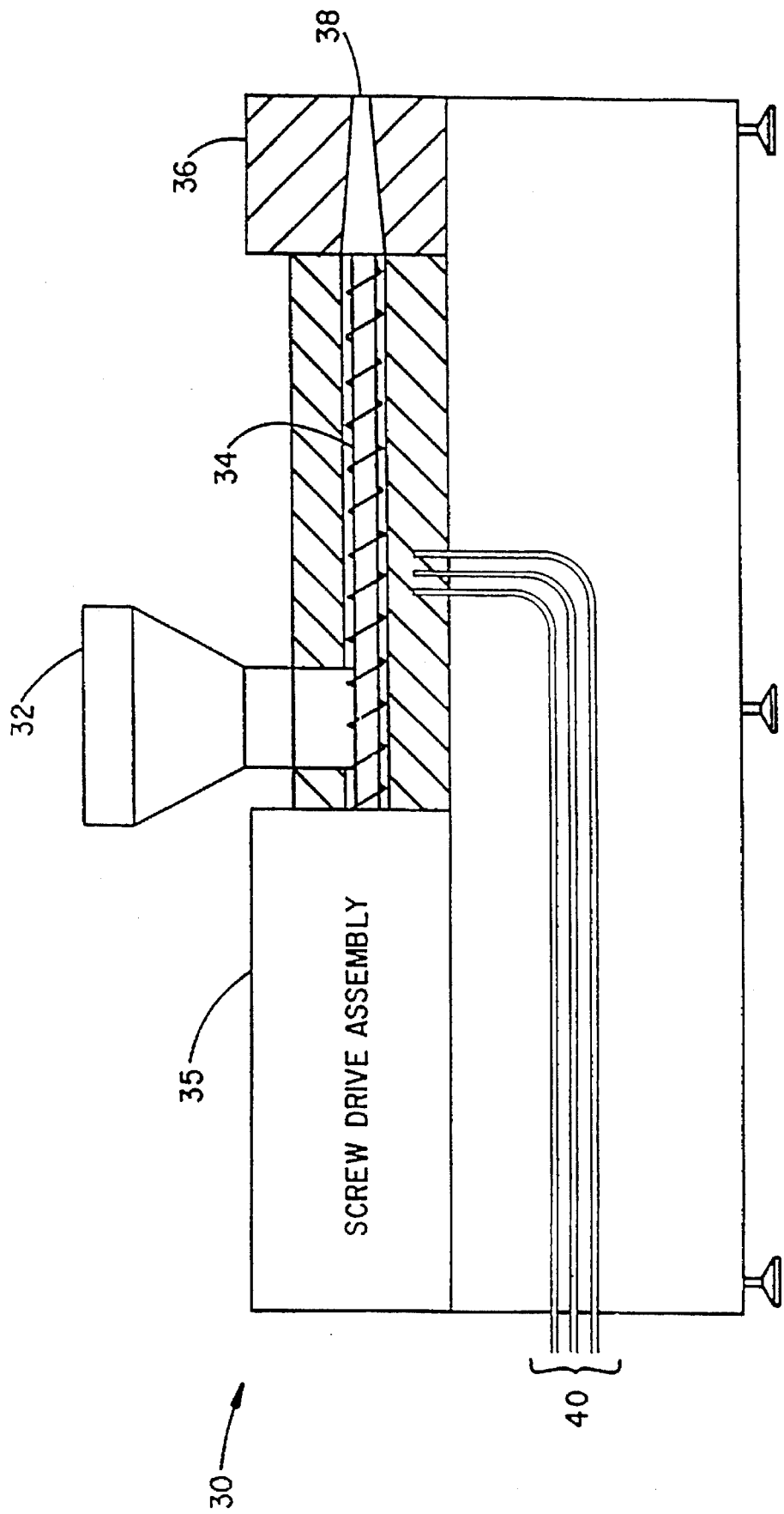

BIOCOMPOSITE MATERIAL AND METHOD OF MAKING

CROSS-REFERENCE TO RELATED APPLICATIONS

This is a continuation of U.S. Ser. No. 08/258,187, filed Jun. 10, 1994, and a Continuation-In-Part of U.S. Ser. No. 08/211,567, filed May 2, 1994 (a national stage application from PCT/US93/07538, filed Aug. 11, 1993 as a Continuation-In-Part of U.S. Ser. No. 07/928,965, filed Aug. 11, 1992, now abandoned).

FIELD OF THE INVENTION

The present invention relates to biocomposite materials, particularly to a thermoset biocomposite particulate material made from a ground leguminous crop and cellulosic material that forms a structurally rigid thermoset biocomposite material upon fusing the particulate material. The resultant material emulates the aesthetic characteristics of stone and can be engineered to meet the physical characteristics of wood.

BACKGROUND OF THE INVENTION

With growing concerns and pressures to develop products out of renewable resources, various efforts have been directed at developing useable products from agricultural crops. The majority of these efforts have been directed at producing replacements for petrochemical-based plastics and fuels as well as wood-based panels, for example. Furthermore, with growing concerns and pressures to find alternative uses for waste matter, various efforts have been directed at developing useable products from recycled newsprint and other paper stocks. The majority of these efforts have been directed at producing building insulation materials, fiberboard, particle board, and the like.

Insulation materials prepared from dry, shredded cellulosic materials or multiple layers of newspaper are described in U.S. Pat. No. 4,184,311 (Rood) and U.S. Pat. No. 4,300,322 (Clark), and Australian Application Serial No. 36603/84 (Hartlett et al.). Stable blocks formed of shredded newspaper and 0.5–3% of a ligninsulfonate binder are described in U.S. Pat. No. 4,148,952 (Nelson et al.). These blocks are used to consolidate waste paper to facilitate handling and transport to locations where the blocks are shredded.

Numerous processes are known for producing structural building materials, e.g., fiberboard, panel board, particle board, from waste paper. For example, U.S. Pat. No. 4,111,730 (Balatinecz) discloses paper flake board prepared from shredded waste paper, e.g., flakes of about 0.5–2 inches by 1–6 inches, and a synthetic petrochemical-based thermosetting resin, e.g., urea-formaldehyde or phenol-formaldehyde resin. The resin is used in an amount to provide 6–15% resin solids. The moisture content of the paper flakes during blending with the resin is maintained at less than 12%. To enhance the surface quality of the resulting paper flake board and to enhance strength and stiffness, a mixture of wood flour or cellulosic matter and a formaldehyde-containing resin is coated on the surface.

U.S. Pat. No. 5,011,741 (Hoffman) discloses a multiple ply paper product, e.g., linerboard, produced from layers of Kraft pulp, i.e., pulped wood chips, and pulped newsprint, i.e., newsprint subjected to chemical dispersants used in conventional pulping processes. The pulped newsprint is substantially free of fines and fibers having a length less than 50 microns. It is impregnated with cooked cationic starch to enhance internal strength and bonding between the layers.

U.S. Pat. No. 4,994,148 (Shetka) and U.S. Pat. No. 5,064,504 (Shetka) also disclose methods for creating molded structural blocks from a newsprint slurry which is formed in a screen wall molding chamber of a press. The newsprint or other cellulosic product is combined with a sufficient mount of water, e.g., a 50:50 mixture, to pulp the paper into a flowable form. A plaster, cement, or latex binder can also be added to the aqueous pulp slurry. The resultant slurry is then poured into the molding chamber. Curing of the blocks is effected through air drying.

U.S. Pat. No. 3,718,536 (Downs et at.) discloses a composite board formed from a mass of shredded paper containing a thermoplastic polymer such as polyethylene, polypropylene, polyvinyl chloride, and the like. The composite board is made of individual pieces, i.e., sheets or shreds, of paper, arranged in an overlying and overlapping configuration, which is distinguished from composite boards made from fibrous materials prepared by wet or dry processes. In the process, the paper pieces are coated with the thermoplastic polymer, which binds the pieces together. Thus, cross-sections of the composite board reveal lamination of paper plies surface-bonded, i.e., contact-bonded, together by the thermoplastic polymer. Such materials containing thermoplastic polymers are unuseable in building products, however, because of fire regulations. This is because thermoplastic materials soften upon exposure to elevated temperatures and thereby lose their structural integrity.

All previously known panel materials containing cellulosic materials from waste paper, paper products, or pulp waste and/or agricultural products, unless separately laminated with a decorative finish laminate, have uniformly demonstrated undesirable properties. For example, they generally possess dull grey or matte grey colors without any distinctive or aesthetically appealing patterns. Furthermore, they generally lack the strength, stiffness, hardness, and durability of structural grade building materials. Also, they are generally too porous for many applications.

The lack of materials containing renewable natural resources with such desirable characteristics is believed due to a variety of factors, including, for example: (1) the lack of processing means for repeatedly producing an aesthetically pleasing texture and coloration of the finished material; (2) the lack of processing means for repeatedly producing cellulose-based material having the strength and stiffness of structural grade materials; (3) shredding and repulping of waste paper reduces the length of the cellulose fibers that can compromise the tear and shear strength of the finished material; (4) costly de-inking and bleaching of the cellulosic material, which reduces the competitiveness of the material; and (5) the potential presence of undesired contaminants in the waste paper stock that can deleteriously effect surface finish, bonding, rigidity, and structural integrity of the product.

SUMMARY OF THE INVENTION

In appreciation of the above and to overcome the shortcomings of the prior art, the present invention provides fiber-reinforced protein-based biocomposite particulate material, i.e., discrete particles, made from a legume-based thermosetting resin and cellulosic material. It also provides structurally rigid biocomposite pressure-formed materials produced from the particulate material upon fusing the particulate material under elevated pressure and temperature. The individual particles, which can also include a colorant, maintain clearly defined and distinct boundaries once fused. This results in the formation of a pressure-formed material that can exhibit a colorized pattern resembling granite and other natural stones. The invention also discloses the processes necessary to fabricate the particulate material and products therefrom, i.e., board stock and other pressure-formed materials.

The particulate material and resultant pressure-formed materials contain the legume-based resin and fibrous cellulosic material in amounts such that the ratio of cellulose solids to resin solids is about 0.8:1.0 to about 1.5:1.0, preferably about 0.8:1.0 to about 1.3:1.0. Particularly preferred pressure-formed materials also include a secondary thermosetting binder, such as an isocyanate, preferably an aromatic isocyanate, for enhanced mechanical and physical properties.

The discrete fiber-reinforced protein-based particles initially formed have a moisture content of about 55–75% and a particle size no greater than about 0.5 inch (1.3 cm). For particular advantage in the pressure-forming process, the moisture content of these discrete particles is reduced to less than about 20%, preferably to less than about 15%, and more preferably to less than about 12%. For forming pressure-formed products using the secondary thermosetting binder, e.g., an aromatic isocyanate, the moisture content is most preferably about 6–8% to provide particularly enhanced mechanical and physical properties. These properties are further enhanced through the use of a water-repellant sizing agent in combination with the secondary thermosetting binder.

The discrete biocomposite particles are capable of forming a rigid biocomposite material having a Modulus of Rupture of about 1000–10,000 pounds per square inch (psi) and a Modulus of Elasticity of about 100,000–1,000,000 psi (when tested in accordance to ASTM:D1037-91). Typically, with the use of the secondary thermosetting binder (e.g., an aromatic isocyanate) and the water-repellant sizing agent (e.g., a water-soluble waxy material), the rigid biocomposite pressure-formed material has a Modulus of Rupture of greater than about 3500 psi, preferably greater than about 4000 psi, and more preferably greater than about 4500 psi, and a Modulus of Elasticity of greater than about 500,000 psi, preferably greater than about 600,000 psi, and more preferably greater than about 700,000 psi.

The present invention is also directed to methods of preparing these materials. These methods involve: preparing an aqueous legume-based resin having a pH of about 10–14, preferably containing a colorant; and combining a fibrous cellulosic material with the aqueous legume-based resin in an amount and manner effective to form discrete biocomposite particles having a moisture content of about 55–75%, a particle size of no greater than about 0.5 inch (1.3 cm), and a ratio of cellulose solids to resin solids of about 0.8:1.0 to 1.5:1.0. These particles, preferably having a moisture content of less than about 20%, can then be fused into a rigid pressure-formed material by pressing the dry biocomposite particles under an elevated temperature and pressure, preferably a temperature of about 250°–340° F. (121°–171° C.), and a pressure of about 450–750 psi. In particularly preferred embodiments the dried particles are coated, e.g., spray-coated, with the secondary thermosetting binder prior to fusing the particles into a rigid biocomposite pressure-formed material.

Various advantages and distinctions of the present invention will become more apparent from the following detailed description, including the figures and examples.

BRIEF DESCRIPTION OF THE DRAWINGS

FIGS. 1a and 1b are a photograph of the particulate material of the present invention, in a high moisture-content state and in a dry state.

FIG. 4 is a block diagram of an alternative method of manufacturing the particulate material and an extruded product of the present invention.

FIG. 6 is a schematic of a continuous extruder station.

DETAILED DESCRIPTION

Biocomposite Material

Figure 2:
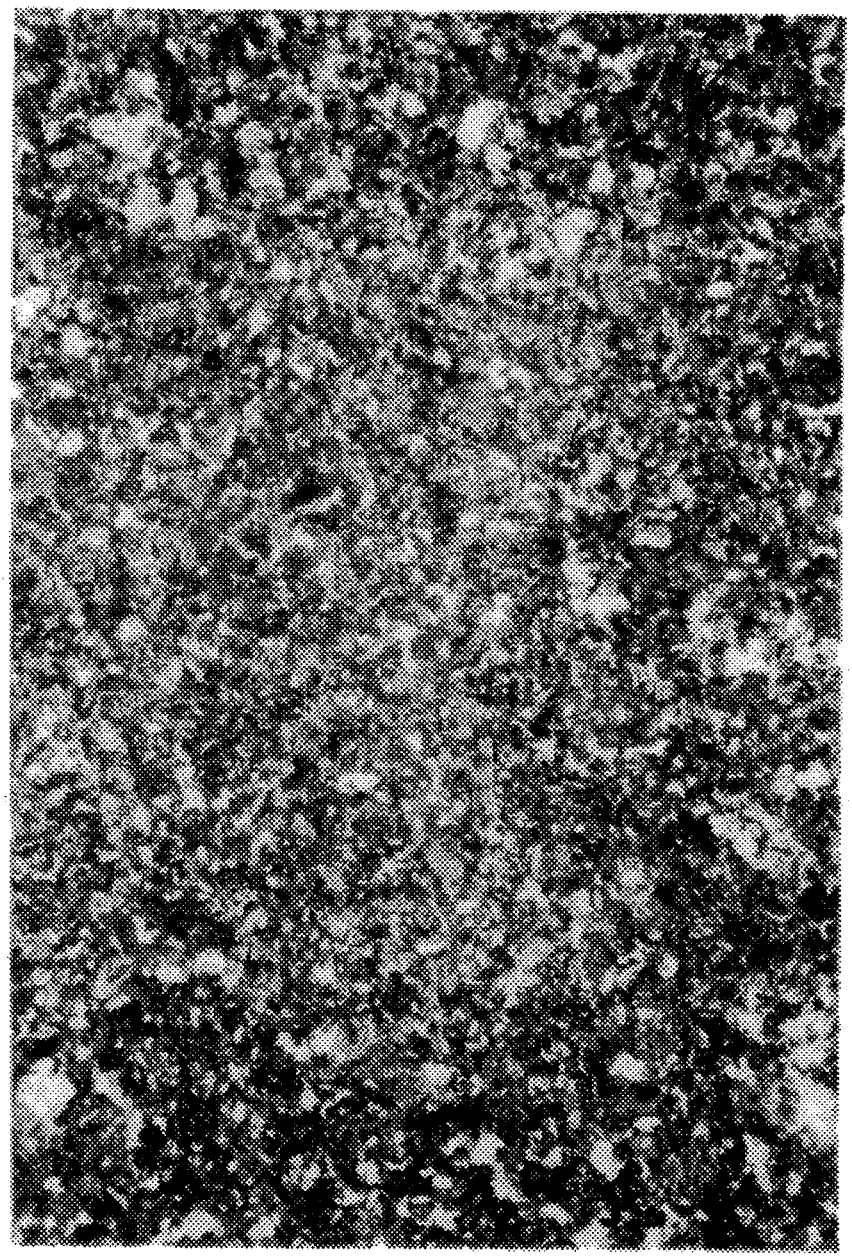
FIG. 2 is a photograph of the granular structure and stone-like appearance of a section of board stock prepared from the particulate material of FIG. 1.

The present invention provides a thermoset biocomposite particulate material made from a ground leguminous crop and cellulosic material that forms structurally rigid thermoset biocomposite materials upon fusing the particulate material under pressure. The individual particles are fiber-reinforced protein-based biocomposite particles that can also include a colorant if desired. Once fused into a structurally rigid product, either through compression molding or extrusion molding, for example, the particles maintain clearly defined and distinct boundaries forming irregularly shaped domains. Thus, particles of varying shades and colors can be combined to form products, e.g., board stock, that exhibit colorized patterns resembling granite and other natural stones of an igneous nature or natural wood tones and/or grains such as burled wood. That is, a granular appearance is exhibited which in one instance closely resembles granite. Other appearances are attainable upon varying the concentrations of the sized particulates and colorants, however. FIG. 1 is a photograph of the particulate material of the present invention, in a high moisture-content state and in a dry state, and FIG. 2 is a photograph of the granular structure and stone-like appearance of a section of board stock prepared from the particulate material of FIG. 1.

Such pressure-formed materials, however, exhibit physical properties more like wood than stone. That is, they exhibit densities, structural integrity, rigidity, and machinability that is more characteristic of natural wood than stone. Furthermore, the strength, stiffness, density, hardness, and durability of the pressure-formed materials of the present invention can be much greater than particle board or other wood composite or cellulose-based composite board products, and equivalent to structural grade wood-based flake board.

Thus, the present invention provides irregularly patterned, multi-colored, i.e., granite-like, rigid biocomposite pressure-formed materials. Such granite-like patterns have never before been accomplished in composite materials, particularly composites containing cellulosic materials such as newsprint. Thus, the biocomposite materials of the present invention result from an appreciation of the process of forming natural stone and the relationship of human perceptions of natural stone. That is, natural stone is formed from densely packed random crystals of variously colored minerals, which, over time in response to specific physical laws, combine and tend toward a minimum energy system. Such a process parallels recent understandings of the theories of ordered chaotic systems. Human eye-brain perceptions, in contrast, are learned. Thus, any recognition and appreciation that a material is "natural" or "artificial" is formed upon a mental comparison to learned perceptions. Because the artificially produced materials of the invention closely approximate the natural random crystal ordering of igneous stone, particularly granite, the resultant material is perceived to be stone.

The density and machinability characteristics of the rigid pressure-formed granite-like materials are comparable to wood, such as oak, maple, walnut, tropical hardwoods, etc., and often better than wood-like materials, such as flake or particle board. For example, the stock can be sawed, routed, planed, sanded, and finished like cabinet-grade wood. The material accepts nails and screws in a similar fashion, generally without fracture or splitting. The material also has edges that can be machined and finished as do natural wood products, as opposed to particle or flake boards which require the use of expensive edging of wood inlay strips. The material may also be used as part of large or complex assemblies or structures constructed of a number of individual panels or pieces joined together with conventional cabinetry techniques. The limited porosity of the pressure-formed biocomposite material also renders it suitable for vacuum impregnation with acrylics, epoxy resins, varnishes or other surface treatments to increase the suitability of the material for building, decorative or structural purposes.

The biocomposite particulate material of the present invention, and the resultant pressure-formed products, include primarily renewable natural resources, i.e., cellulosic material, such as recycled newspaper, and a protein-based resin prepared from ground leguminous material, such as soy flour. That is, the particulate material is primarily a cellulose-reinforced vegetable protein-based thermosetting resin system. This protein-based resin (also referred to herein as a legume-based resin) forms the matrix, i.e., the primary binding agent, of the biocomposite material of the present invention, whether in the form of particulate material or pressure-formed material. Preferably, on a dry weight basis, the ratio of cellulose to resin solids, e.g., paper to soy flour, is about 0.8:1.0 to about 1.5:1.0, and more preferably about 1.0:1.0 to about 1.3:1.0. Thus, the amount of the thermosetting resin solids relative to the total amount of resin solids and cellulose solids in the particulate material prior to pressure-forming is preferably about 40–56%, and more preferably about 43–50%.

Upon sectioning the preferred composite particles prepared from waste newspaper and soy flour at the most preferred moisture content and ratio of resin solids to cellulose solids, the particles appear to contain pieces of paper fully impregnated with resin such that individual fibers of the paper are resin coated (or more appropriately, fused with resin). That is, a new composite material is prepared rather than a material that is produced by simply gluing together paper pieces by an adhesive through contact bonding.

Upon formation, the particulate material preferably contains about 55–75% moisture, i.e., water, and more preferably about 59–67% moisture, based on the total wet weight of the particles. As used herein, this material is referred to as the "high moisture-content" particulate material or particles. These particles are typically in the form of soft, pliable, tacky, irregularly shaped lumps or balls, although individual fiber-like particles can also be formed. They typically have a particle size (as determined by the largest dimension of the particle) of no greater than about 0.5 inch (1.3 cm), and often no greater than about 0.38 inch (0.97 cm). Typically, particles larger than this do not generally process well, e.g., dry or press well. These discrete particles are formed substantially simultaneously from an agglomerated mass of cellulosic material and legume-based resin under appropriate processing conditions, as described below. They have a relatively dry-feeling or semi-dry feeling even though they contain a large amount of water, e.g., about 55–75% total water content, which is believed to be bound within the particles such that it cannot be readily squeezed out under hand pressure as water is from a sponge. These high moisture-content particles have sufficient internal bond strength to exist as discrete particles. Thus, they can be handled relatively easily in bulk manufacturing processes without significantly sticking together and agglomerating into larger particles.

Distinct advantages have been obtained upon forming such high moisture-content particles. For example, the unique "granite-like" appearance of the pressure-formed products of the present invention results from the fact that the composition and process described herein forms composite particles of this type. Although particles containing about 55–75% water are capable of forming pressure-formed products, particular advantage is realized if the moisture content is within a range of about 59–67%. That is, when the moisture content of the originally formed particles is about 59–67%, particularly desirable pressure-formed products with respect to their mechanical properties (e.g., high modulus of rupture, high modulus of elasticity, high hardness) and physical properties (e.g., low water absorption), are obtained, as illustrated by Example 2. Although the inventors do not intend to be held to any particular theory, it is believed that this optimum moisture content provides substantially complete impregnation of the cellulosic material, e.g., paper flakes, by the protein-based resin such that all the fibers are integrally associated or "fused" with the resin. If less than about 59% water is present in the high moisture-content particles, the cellulosic material is not fully impregnated and cellulose fibers protrude from the pliable balls forming "fuzzy" extensions. There may even be pieces of uncoated paper. If greater than about 75% water is used in the preparation of the particles, a slurry generally results from which particles are not formed. Furthermore, at such a high water content, the soy resin is diluted to the extent that the interparticle bond strength is reduced considerably. Thus, these high moisture-content particles are not simply surface-coated pieces of paper, nor are they particles of pulped paper.

Typically and preferably, prior to fusing into a rigid pressure-formed material, the moisture content of the high moisture-content biocomposite particulate material is reduced to less than about 20%, preferably less than about 15%, more preferably less than about 12%, and most preferably about 3–12%, based on the total weight of the biocomposite particles. If the moisture content is too low, however, the biocomposite particles do not generally bind well upon fusing them together under elevated pressures and temperatures, without the addition of a secondary thermosetting binder. For certain applications, the moisture content is narrowly tailored to about 8–11%, whereas in other applications the moisture content is narrowly tailored to about 6–8%. Generally, the biocomposite particles containing 6–8% moisture are ideal for preferred processes wherein the particles are coated with a secondary thermosetting binder, e.g., an aromatic isocyanate.

During the drying process, not only is water removed but the protein-based resin is at least partially cured. In this way, the particulate material has internal bond strength. Furthermore, these particles are capable of being bonded or fused together under heat and pressure. This is because the viscoelasticity can be altered with elevated temperatures and pressures such that the particles are plasticized and flowable but not meltable, i.e., the thermoset resin/cellulose composite particles are plastically deformable but not sufficiently thermoplastic to melt. It is also believed that the thermoset resin further cures such that there are resin-resin interactions between the particles, although not to such an extent that the particles flow together and lose their distinct boundaries.

These dried biocomposite particles are generally platy and irregularly shaped, although they can be spherical in shape. Upon losing water, there is a significant reduction in the volume of the particles. Thus, the particle size (as determined by the largest dimension of the particle) is typically no greater than about 0.5 inch (1.3 cm), and often no greater than about 0.38 inch (0.97 cm). Although the particle size is generally greater than about 0.05 inch (0.13 cm), there can be small fiber-like particles, i.e., small cellulosic fibers fused with the leguminous resin. Typically, however, the fraction of fines, i.e., dried biocomposite particles having a particle size less than about 0.05 inch (0.13 cm), is less than about 5% by weight. The specific gravity of the dried particles is typically about 0.7–1.0, preferably about 0.9–0.95.

The cellulosic material can be any cellulosic-containing material, such as newspaper, glossy paper, uninked paper, office paper, computer paper, phone books, coated papers, cellulose insulation (coated or uncoated), Kraft paper, agricultural fiber (e.g., hammer-milled corn stalks), pulped wood fiber, paper mill waste sludge, etc. Such cellulosic materials are useful if they contain fibrous extensions of the type that result from shredding or hammer milling. Thus, useful cellulosic materials are those that are fibrous, i.e., have fibrous extensions. That is, smooth cellulosic material, such as non-bond typing paper that has been cleanly cut into pieces is generally not as useful as that which has been hammer milled. Of the cellulosic materials listed above, the preferred materials are newspaper, uninked paper, office paper, computer paper, uncoated cellulose insulation, and paper mill waste sludge. More preferably, the cellulosic material is shredded or hammer-milled newspaper of the type that is used as insulation. The cellulosic material can optionally include a fire retardant, e.g., boric acid, in an amount up to about 15% by weight of dry cellulosic material.

Depending upon various appearance and mechanical attributes desired for the finished end product, the particle size and shape of the fibrous cellulosic material can vary. Generally, the cellulosic material includes a broad distribution of sizes (e.g., individual fibers up to 1-inch (2.54-cm) strips of paper) and shapes (e.g., round, elongated, or irregularly shaped pieces of paper). Preferably, the particle size (as determined by the largest dimension) of the majority (i.e., greater than 50%) of the cellulosic material is less than about 1 inch (2.5 cm), more preferably less than about 0.5 inch (1.3 cm), and most preferably about 0.06 inch (0.16 cm) to about 0.38 inch (0.95 cm). For example, a typical cellulosic particle used in making the products of the present invention has nominal dimensions of approximately 0.25 inch (0.64 cm) by 0.5 inch (1.3 cm). The aspect ratio, i.e., length to width, of the bulk of the particles of cellulosic material is typically no more than about 3:1 and can be about 1:1, although fibers can be present which can have a quite large aspect ratio. Thus, cellulosic material used in the present invention can include cellulose particles or flakes admixed with loosely compacted cellulose fibers or fines, i.e., dust-sized particles. Preferably, in such an admixture, advantage is realized in processing if the fines are below about 10% of the total weight of the material.

Although the fibrous cellulosic material, e.g., shredded newsprint, can be used by itself as the reinforcing material for the legume-based resin, other fibrous materials can be included to provide certain desirable attributes. For example, chopped fiberglass, spun plastics, or other fibrous additives of appropriate fiber length can be incorporated into the biocomposite particulate material of the present invention or into the pressure-formed rigid biocomposite material of the present invention. Depending upon the fibrous material, the fibers can be randomly dispersed or mixed in various fashions to predetermined alignments. For example, where a directional fiber layering is used, a board stock can be developed from multiple laminations having specific axial alignments of the added fiber. The derived board stock can thereby exhibit preferential bending, shaping, shear or tear characteristics. Alternatively, laminations of random fiber alignment can be laid down one upon another. In all cases, however, a stone-like appearing board stock is obtained with improved structural integrity.

The ground leguminous material that is used in the formation of the legume-based resin includes any of the nitrogen-fixing crops, such as beans, peas, clover, and alfalfa, for example, that is ground to a particulate material, e.g., a meal or flour-like material. Preferably, the leguminous material is an edible leguminous crop, i.e., a pulse crop, such as soybeans, pinto beans, peas, pelagis, etc. The leguminous material can be in various forms and sizes. For example, the leguminous material can be in the form of ground whole beans (including the hulls, oil, protein, minerals, etc.), a meal (extracted or partially extracted), a flour (i.e., generally containing less than about 1.5% oil and about 30–35% carbohydrate), or an isolate (i.e., a pure protein flour containing less than about 0.5% oil and less than about 5% carbohydrate). As used herein, "flour" includes within its scope material that fits both the definitions of flour and isolate. Preferably, the leguminous material is in the form of a flour, at least because the pressure-formed products produced from a flour, as opposed to a meal, has more desirable physical properties (e.g., water absorption) as well as mechanical properties (e.g., modulus of rupture and modulus of elasticity).

Preferably, the leguminous material has a particle size (as determined by the largest dimension) of less than about 0.1 inch (0.25 cm), and more preferably less than about 0.05 inch (0.125 cm). If the particle size is much larger than this, the leguminous material is not sufficiently soluble and the resultant pressure-formed products have lessened mechanical properties, e.g., board strength, and less visual perfection. Furthermore, the time required to solubilize the material is undesirably long. Although material such as a meal can be used, wherein about 75% does not pass through a 28 mesh screen (i.e., 0.0334 inch, 0.08 cm) and about 5% passes through a 60 mesh screen (i.e., 0.0167 inch, 0.04 cm), a flour is more preferred because of its generally smaller particle size distribution, as illustrated in Example 6. That is, the most preferred ground leguminous material has a maximum particle size of that of a flour, i.e., about 0.005 inch ($12.7 \times 10^{-3}$ cm). There does not appear to be a minimum particle size requirement for the ground leguminous material; however, the particle size of commercially available soybean flour is generally less than about 0.003 inch ($7.6 \times 10^{-3}$ cm). For example, for commercially available soybean flour, greater than about 92% passes through a 325 mesh screen, which corresponds to a particle size of about 0.003 inch ($7.6 \times 10^{-3}$ cm).

Preferably, the leguminous material has a dispersible protein content of about 20–100 pdi (i.e., protein dispersion index), and more preferably about 70–100 pdi, as illustrated by Example 5. Most preferably, the ground leguminous material is a soybean flour having a dispersible protein content of about 70–95 pdi. This material represents a desirable balance between residual carbohydrate concentration and the soluble protein level, i.e., water-soluble protein. A 90 pdi soy flour contains soluble protein in an amount of about 90% of the total available protein. A typical 90 pdi soy flour contains, by total weight, a soluble protein level of about 50–55%, a residual carbohydrate level of about 30–40%, and less than about 1.5% oil, with the remainder being hulls, water, and ash, including minerals (about 5–10%). A suitable 90 pdi soy flour containing 50% protein, 40% carbohydrate, 5% water, 4% ash, and 1% fat can be obtained from Honeymead Products Company (Mankato, Minn.).

The legume-based resin, i.e., the matrix of the biocomposite material of the present invention, is prepared by combining the ground leguminous material with a highly alkaline aqueous solution containing an alkaline dispersing agent, such as a strong inorganic or organic base. The base is preferably a strong inorganic base, such as KOH, NaOH, CaOH, $NH_4OH$, or combination thereof. Preferably, the base is KOH or NaOH, more preferably KOH. Most preferably, the pH is adjusted to the appropriate level using both KOH and CaOH, at least because potassium and calcium ions tend to inhibit moisture transport and thus impart a measure of moisture resistance to the final product. An amount of base is used to provide a resin having a pH of about 10–14, preferably about 10–13, and more preferably about 12–13. A pH lower than about 10 generally does not provide particulate material of the desired consistency. This alkaline-dispersed protein-based, i.e., legume-based, resin preferably contains about 58–92% water, and more preferably about 72–83% water, based on the total weight of the resin.

The ground leguminous material is used in the protein-based resin in an amount effective to produce a generally smooth resin having a viscosity of about 37,000–640,000 centipoise (cps), preferably about 104,000–184,000 cps at 65° F. (18° C.). Preferably, the ground leguminous material is used in an amount of about 15–40% by weight based on the total weight of the resin. More preferably, it is used in an mount of about 20–40%, and most preferably about 30–35%. Depending upon the nature of the cellulosic material and the properties desired in the pressure-formed products, the amount of ground leguminous material can be varied, although the viscosity should be maintained within the desired range (i.e., 37,000–640,000 cps), which is significantly higher than the viscosities of typical protein glues (i.e., 500–75,000 cps) used in the production of particle board, etc.

This resin is a thermosetting resin, i.e., it solidifies irreversibly when heated, typically through mechanical bonding and chemical cross-linking reactions. This makes the resultant pressure-formed products useable for possible structural building materials because they maintain structural integrity in a high temperature or fire situation compared to thermoplastic resin compositions. The resin can be stored for subsequent use, but the shelf life is typically limited to less than about 12 hours, and often to less than about 1 hour if cross-linking agents are used.

The resin can also include a water-dispersible colorant that can withstand the processing conditions discussed below, e.g., temperatures as high as 450° F. (232° C.) and a pH within a range of about 10–14. That is, the colorant must be able to maintain color fastness under heat, pressure, and high alkaline conditions. Furthermore, the colorant should be UV-stable and capable of being uniformly dispersed in a highly alkaline aqueous solution. Also, each colored particulate material must not significantly bleed or transfer color to adjacent colored particulate material during processing into the pressure-formed products. These requirements are generally met by commercially available inorganic or organic colorants, i.e., dyes or pigments, used in composite materials.

Suitable inorganic colorants are generally metal-based coloring materials, such as ground metal oxide colorants of the type commonly used to color cement and grout. Such inorganic colorants include, but are not limited to: metal oxides such as red iron oxide (primarily $Fe_2O_3$), yellow iron oxide ($Fe_2O_3.H_2O$), titanium dioxide ($TiO_2$), yellow iron oxide/titanium dioxide mixture, nickel oxide, manganese dioxide ($MnO_2$), and chromium (III) oxide ($Cr_2O_3$); mixed metal rutile or spinel pigments such as nickel antimomy titanium rutile (${Ti,Ni,Sb}O_2$), cobalt aluminate spinel ($CoAl_2O_4$), zinc iron chromite spinel, manganese antimony titanium ruffle, iron titanium spinel, chrome antimony titanium rutile, copper chromite spinel, chrome iron nickel spinel, and manganese ferrite spinel; lead chromate; cobalt phosphate ($CO_3(PO_4)_2$); cobalt lithium phosphate ($CoLiPO_4$); manganese ammonium pyrophosphate; cobalt magnesium borate; and sodium alumino sulfosilicate ($Na_6Al_6Si_6O_{24}S_4$). Suitable organic colorants include, but are not limited to: carbon black such as lampblack pigment dispersion; xanthene dyes; phthalocyanine dyes such as copper phthalocyanine and polychloro copper phthalocyanine; quinacridone pigments including chlorinated quinacridone pigments; dioxazine pigments; anthroquinone dyes; azo dyes such as azo naphthalenedisulfonic acid dyes; copper azo dyes; pyrrolopyrrol pigments; and isoindolinone pigments. Such dyes and pigments are commercially available from Mineral Pigments Corp. (Beltsville, Md.), Shephard Color Co. (Cincinnati, Ohio), Tamms Industries Co. (Itasca, Ill.), Huls America Inc. (Piscataway, N.J.), Ferro Corp. (Cleveland, Ohio), Engelhard Corp. (Iselin, N.J.), BASF Corp. (Parsippany, N.J.), Ciba-Geigy Corp. (Newport, Del.), and DuPont Chemicals (Wilmington, Del.).

The colorant is typically added to the legume-based resin without further processing and in an amount suitable to provide the desired color. Preferably, the colorant is present in the particulate material in an amount no greater than about 15% by weight of the legume-based resin, more preferably no greater than about 10%, and most preferably no greater than about 3%.

The legume-based resin can also include a defoaming agent, a fining agent, or a combination thereof. Each of these additives is used in the resin in an amount to provide desirable characteristics to the resin and particulate material produced therefrom. For example, a fining agent, i.e., dispersing agent, can be used to improve the texture, i.e., smoothness, as well as surface tension, viscosity, and flow properties of the resin. The fining agent also aids in dispersing the resin components, particularly the colorant, adjusting the viscosity of the resin, and can even act as an adhesion promoter. A defoamer, i.e., defoaming agent, can be used to release entrapped air, which can adversely affect the strength of the pressure-formed materials. Preferably, a defoaming agent and a fining agent are used alone, or in combination, in an amount of no greater than about 8%, and more preferably no greater than about 5%, by weight of the resin. That is, whether used alone or in combination, the total amount of defoaming agent plus fining agent is no greater than about 8%. Suitable defoaming agents include, but are not limited to, pine oil and silicone defoamers. Suitable fining agents include, but are not limited to, sodium silicate and CoCob, i.e., ground corn cobs.

The legume-based resin used to prepare the composite particulate material can also contain minor amounts of other additives, such as inert fillers, latex emulsions or waxy materials, cross-linkers, thermoplastic adhesive binders, thermosetting adhesive binders, fire retardants, fungicides, catalysts, and insecticides. Each of these additives is used in the resin in an amount to provide desirable characteristics. For example, a filler can be used in an amount to add bulk and reduce the porosity of the resultant pressure-formed product. Suitable fillers include, but are not limited to, wood flour, bentonite, kaolin, dust, and recycled biocomposite material of the present invention. A latex emulsion or waxy material can be used in the resin formulation in an amount to increase the water resistance of the particle. Alternatively, or additionally, a waxy material can be applied to the dry biocomposite particulate material. Suitable latex emulsions include, but are not limited to, latex emulsions available under the tradename FULATEX PD-0512, which is a blend of polyvinyl acetate and a latex emulsion from H. B. Fuller Company (St. Paul, Minn.), styrene-butadiene resin, and any latex emulsion typically used in water-based paints. Suitable waxy materials include, but are not limited to, slack wax and wax emulsions available from H. B. Fuller Company (product number RM0255) and Hercules Incorporated (Wilmington, Del., product number 2100P). A cross-linker can be used in the resin in an amount to strengthen the internal bond strength of the individual particles. Suitable cross-linkers include, but are not limited to, formaldehyde-based latex resins suitable for use as cross-linkers available under the tradename FULLREZ (product number WB-2523) from H. B. Fuller Company (St. Paul, Minn.), dialdehyde starch, and ammonium chloride. A thermoplastic adhesive binder can be used in the resin in an mount to increase the strength and hardness characteristics of the individual particles, although it is preferred to avoid the use of thermoplastic materials in the products of the present invention. Suitable thermoplastic adhesive binders include, but are not limited to, polyvinyl acetate ("PVA"). This can be added alone, or in combination with a latex emulsion as is done in the examples in the form of H. B. Fuller Company's FULATEX PD-0512. A fire retardant can be used in the resin in an amount effective to reduce the flammability of the cellulosic material. Alternatively, or additionally, the fire retardant can be added directly to the cellulosic material. When added to the resin, however, a fire retardant such as boric acid aids in dispersing the dry ingredients. Suitable fire retardants include, but are not limited to, boric acid and ammonium sulfate.

Preferably, these additives are used alone or in combination in an mount of no greater than about 20%, and more preferably no greater than about 10%, by weight of the resin. Thus, the resin and resultant particulate material and pressure-formed products contain no more than about 20% thermoplastic materials, such as thermoplastic adhesive binders. Preferably, they contain no greater than about 10% and more preferably no greater than about 5%. Most preferably the resin, particulate material, and pressure-formed products of the present invention are substantially free of thermoplastic materials, particularly thermoplastic adhesive binders.

The legume-based resin and cellulosic material are combined in a manner to form the high moisture-content particulate material described above. Upon drying, the particulate material can be stored for an indefinite period of time before being formed into the pressure-formed products. The particulate material can be formed into rigid materials under elevated pressures and temperatures. This can be done without any additional themosetting binders other than the legume-based resin itself.

For particularly advantageous results the dry particulate material is preferably coated with a secondary thermosetting binder, such as an isocyanate, phenolic, melamine, or urea-containing binder. Preferably, the secondary thermosetting binder is an organic isocyanate, and more preferably an aromatic isocyanate. The isocyanate provides greater mechanical properties, e.g., stiffness and strength, to the pressure-formed products. For example, it decreases the amount of cupping and warping of the pressure-formed material. As shown in Examples 7 and 8, the use of isocyanate can increase the modulus of elasticity by about 30–40% and the modulus of rupture by about 60–70%.

The isocyanate also provides greater dimensional stability to the rigid biocomposite pressure-formed material of the present invention. For example it is useful in significantly lowering the water absorption of the pressure-formed products, particularly when used with a sizing agent as discussed below. As shown in Example 8, the water absorption can be decreased by as much as 75%. Such products can be used in applications where a high degree of dimensional stability is required, e.g., as flooring or countertop material. Furthermore, the isocyanate reduces the processing time and energy consumption, thereby making the pressure-forming process significantly more efficient.

It is believed that this is because the strength of the interparticle bonding is significantly improved with the addition of the isocyanate binder to the dry particulate material. Although the inventors do not wish to be held to any particular theory, it is believed that this is due to an increased number of bonding interactions. Not only are there interactions between the protein-based resin and the cellulose as in the nonisocyanate-containing pressure-formed products, but it is believed that there are interactions between the protein-based resin and the isocyanate binder and between the cellulose and the isocyanate binder. Thus, in essence the secondary thermosetting binder interacts with the dried particles containing at least partially cured protein-based resin to create a dual resin system, which provides greater advantage than either used alone.

Suitable isocyanates include, but are not limited to, the aromatic isocyanates 4,4-diphenylmethane diisocyanate (MDI), toluene isocyanate (TDI), xylene diisocyanate (XDI), and methaxylene diisocyanate (MXDI). Preferably, the aromatic isocyanate is MDI. The isocyanate can be used in an amount of about 2–20%, preferably about 2–10%, based on the total weight of the dry biocomposite particles. Preferably, the aromatic isocyanate is used in an amount of about 5–8%. Advantageously, no hardeners or buffers are required to be used with the aromatic isocyanate, thereby reducing any potential for incompatibility with other additives used in the compositions of the present invention.

As discussed in Example 8 below, control of the moisture content of the particles is particularly important when an isocyanate is used. For example, if MDI is added to the wet particles, through addition to the resin prior to addition of the cellulose, no significant advantage is realized in the mechanical properties of the resultant pressure-formed products. However, if the MDI is added 16 the particles that are dried to a moisture content of less than about 20%, preferably less than about 15%, more preferably less than about 12% (often about 3–12%), and most preferably about 6–8%, significant advantage is realized in mechanical properties as well as physical properties.

In addition to, or as an alternative to, the secondary thermosetting binder, a sizing agent having water-repellant properties can be added to the dry particulate material prior to being fused together into a pressure-formed product. The use of a sizing agent, particularly when used in combination with the secondary thermosetting binder, significantly improves the dimensional stability of the pressure-formed panels when they are subjected to water and other liquids or vapors, as illustrated in Example 8. Suitable sizing agents include, but are not limited to, slack wax, agricultural oils, modified agricultural oils, and wax emulsions as described above for use in the resin formulation. Preferably, the waxy or oily material is a wax emulsion. The water-soluble waxy material, i.e., wax emulsion, can be used in an amount of about 0.5–2.5%, based on the total weight of the dry biocomposite particles. Preferably, the waxy emulsion is used in an amount of about 0.9–1.5%. Either or both of these components, i.e., isocyanate binder and sizing agent, alone or in combination, can be coated on the dry particulate material by spray coating or mechanical mixing, for example.

The mechanical and physical properties of the pressure-formed materials of the present invention can be readily controlled and engineered as desired. That is, depending on the additives, resin level, water content of the particles, the applied pressure, and the heating schedule, for example, the density, surface hardness, bending modulus, and tensile and compressive strength of the pressure-formed products can be varied from values comparable to a representative medium-density fiberboard to values exceeding those of oak and even-apitong (a dense tropical hardwood). Thus, a stiffness and strength exceeding that required of structural grade particle board and other building panels may also be obtained. For example, MDI-coated particles can be pressed into panels that have strength and stiffness properties that are equivalent to, or better than, high density particle board of the type used in the manufacture of furniture.

Depending on the various components, amounts, and processing parameters chosen, values for Modulus of Rupture ("MOR") can range from about 1000 psi to about 10,000 psi, and values for Modulus of Elasticity ("MOE") can range from about 100,000 psi to about 1,000,000 psi. The density can also be tailored to a range of about 45–100 pounds per cubic foot (i.e., the specific gravity to a range of about 0.72–1.60). Particularly preferred pressure-formed materials have a density of about 70–90 pounds per cubic foot (i.e., a specific gravity of about 1.1–1.45). Typically, the preferred higher MOR, MOE, density, and specific gravity values can be obtained through the use of high resin levels and/or high pressures. The amount of water absorption as determined by the percentage of edge swell in a 24-hour water immersion test can vary from about 3.5–40%. Typically, the preferred low values can be obtained through the use of a secondary thermosetting resin, e.g., MDI, and/or a sizing agent applied to the dry particulate material prior to pressure forming. Although the most preferred pressure-formed materials, e.g. panels, of the present invention have low water absorption values, e.g., less than about 15% edge swell, those having high water absorption values can still have advantageous mechanical properties (e.g., high MOR, MOE, and density) and thus be useable.

Generally, MOR values of the rigid biocomposite pressure-formed material of the present invention are greater than about 2000 psi, preferably greater than about 2800 psi, and more preferably greater than about 3000 psi. The MOE values are generally greater than about 200,000 psi, preferably greater than about 350,000 psi, and more preferably greater than about 450,000 psi. Rigid biocomposite pressure-formed material prepared according to the processes and formulations of the present invention can attain such MOR and MOE values when thermally pressed at a temperature of about 320° F. (160° C.) and a pressure of about 520 psi, for about 13–14 minutes.

For the rigid biocomposite pressure-formed material prepared according to the processes and formulations of the present in which a secondary thermosetting resin, such as an aromatic isocyanate, is used, the MOR values are generally greater than about 3500 psi, preferably greater than about 4000 psi, and more preferably greater than about 4500 psi. The MOE values are generally greater than about 500,000 psi, preferably greater than about 600,000 psi, and more preferably greater than about 700,000 psi. Rigid biocomposite pressure-formed material containing a secondary thermosetting resin can attain such MOR and MOE values when thermally pressed at a temperature of about 320° F. (160° C.) and a pressure of about 520 psi, for about 8–9 minutes.

Process for Preparation of Biocomposite Material

In general, the pressure-formed products of the present invention are made by a process that involves fusing the dry biocomposite particulate material described above into a rigid thermoset biocomposite material. Preferably, the process involves five separate and distinct stages: (1) obtaining the required raw materials; (2) preparing the legume-based resin, i.e., the biocomposite matrix material; (3) preparing the high moisture-content biocomposite particulate material; (4) reducing the moisture content of the high moisture-content biocomposite particulate material, optionally containing an admixture of separate colorized batches of the particles; and (5) compacting and further curing the dry particulate material, optionally coated with a secondary thermosetting binder. The resulting material, e.g., board stock or shaped object, is suitable for further forming and finishing steps, e.g., structure fabrication, surface finishing, mechanical shaping, etc.

Figure 3:
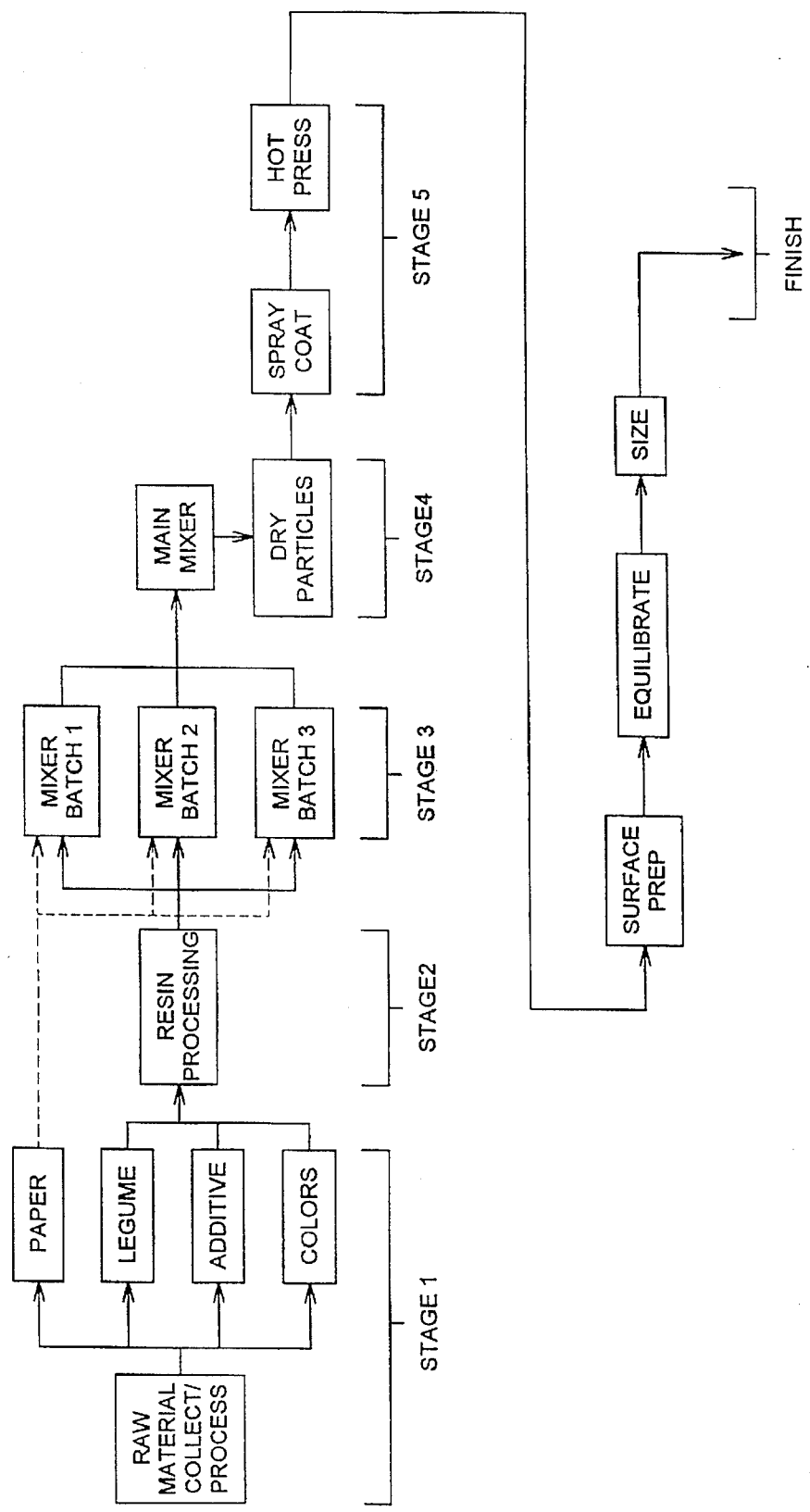
FIG. 3 is a block diagram of a method of manufacturing the particulate material and a pressure-formed board stock of the present invention.

Referring to FIG. 3, a generalized block diagram is shown of the presently preferred process used to fabricate board stock from cellulosic material. This process is described using recycled newsprint and soybean flour. It is to be understood, however, that the process can be modified to use any cellulosic material and any leguminous material as described above. The preferred process is in broad terms carded out in five distinct stages to produce a raw board stock or shaped product. The raw stock is then finished with appropriate sizing, shaping, and surface finishing steps, if desired, to produce a final finished product. If used as a laminate or molding accent, a finished board stock would typically undergo further preparation for attachment to furniture or possibly ceiling or wall panels.

During the first or initial stage, the required raw materials are obtained, and preprocessed if necessary. Such preprocessing can involve selecting, sizing, grading, sorting, and storing in appropriate bins in a form ready for processing in the following stages. These materials typically include a cellulosic material, a ground leguminous material, e.g., soybean derivative, optional colorants, water, and miscellaneous optional additives. Each of the materials is described in more detail above.

During this initial stage, the cellulosic material is typically prepared by dry shredding and/or hammer milling waste paper, such as newsprint or other uncoated printing papers, to desired particulate sizes and relative size concentrations. Alternatively, commercially available loose cellulose fiber insulation can be obtained and used directly. The shredded paper is commingled as necessary with other materials to impart certain desired properties to the finished product, e.g., fire retardance via the addition of boric acid.

The ground soybean material is typically prepared by grinding de-hulled whole beans in a conventional grinding process which operates at below 160° F. (71° C.) to a granularity in the range of 100–325 mesh, preferably 200–325 mesh. As desired, the beans may be pre-washed and may be stripped of natural oils. If the oils are removed, this can be achieved using conventional mechanical or chemical extraction techniques, such as one of the "cold process" oil extraction processes. Alternatively, commercially available soybean flour can be obtained and used directly. The ground soybeans, preferably soybean flour, is not otherwise washed or treated.

The protein-based resin, i.e., biocomposite thermosetting matrix material or adhesive binder, is separately prepared in stage 2 by mixing the processed soybean derivative, i.e., ground soybeans, which can be in the form of a meal or flour, preferably a flour, with a highly alkaline aqueous solution. Added to the resin in suitable quantity and as desired or necessary are minor amounts of various additives, such as colorants, defoaming agents, fining agents, thermoplastic adhesive binders, inert fillers, latex emulsions or waxy materials, etc. These additives impart various desirable properties to the finished product and/or facilitate the removal of water and other liquids in later stage processing. Moisture resistance, fire retardance, mold and fungal resistance, elasticity, and surface hardness represent some of the aforementioned desirable properties.

The ingredients that are used to prepare the resin can be combined in any desired order. Generally, however, it is desirable for the soy flour to be added to water and for any cross-linkers used to be added toward the end of the mixing process. Preferably, any cross-linkers used are added within about one hour before the cellulosic material and the resin are combined in stage 3. The water used can be tap water, distilled water, and condensate from other portions of the process. It can even be milk, which is primarily casein in water. The temperature of the water can vary depending upon the desired mixing rate and viscosity of the resin; however, it is advantageous for the temperature of the water to be at least about 50° F. (10° C.), and preferably about 60°–70° F. (16°–21° C.). Higher temperatures are possible for faster reaction times; however, they are generally undesirable due to higher energy consumption.

The resin ingredients are generally blended for a sufficient period of time to form a homogeneous batter-like consistency. Any conventional batch mixing techniques and batch-type mixers can be used. Preferably, any vertical or horizontal paddle-type mixer, can be used. A paddle-type mixer is typically used to nonturbulantly mix viscous materials. It typically contains one or more paddles rotating in a fixed shell having a rounded bottom and straight sides that provide gentle lifting and good circulation without deterioration of the material being stirred. The use of a mixer equipped with slow-moving paddles that gently lift, fold, and agitate the material, in conjunction with a means for shearing the material to ensure thorough mixing is more preferred. This type of mixer is capable of high shear and slow agitation, which avoids mechanical break down of the protein molecules. Most preferred for preparing the resin of the present invention is a paddle-type mixer equipped with shear bars and chopper blades.

For colored materials, colorants are selected according to the desired color pattern prescribed for the finished product and added during processing of the resin. The eventual coloration of the produced products is obtained upon mixing various proportions of differently colored particulate material derived at stage 3. That is, during stage 3, one or more monochromatic batches of biocomposite particulate material is prepared from the preprocessed components, i.e., the shredded paper and the legume-based resin. A three color batch is depicted, wherein the different style lead lines indicate the mixing of the three separate colorized batches.

During stage 3, the legume-based resin prepared in stage 2 is combined with the ground or milled cellulosic material in a manner to produce agglomeration and particulate formation. That is, mixing conditions, e.g., relative amounts of solids to liquid and the mixing action, are designed such that the cellulosic material and legume-based resin are blended together into a substantially homogeneous agglomerated mass having a fiber-reinforced batter-like consistency. That is, the mixing conditions are designed to ensure the formation of soft, pliable, tacky, discrete, irregularly shaped lumps or bails substantially simultaneously from the agglomerated mass. Typically, this involves using a sufficient amount of water in the blend of resin and cellulosic material such that the desired discrete particles are formed. If too much water is used, relative to the amount of solids, e.g., paper plus soy flour, the individual pieces of the cellulosic material tend to lose their identity through the formation of a fibrous slurry or the mixture agglomerates into a large mass without the formation of discrete particles. If too little water is used, "fuzzy" particles are formed and/or unblended paper particles remain. Preferably, the water content of the blend, i.e., the legume-based resin including any optional ingredients and cellulosic material, should be about 55–75% for the discrete particles to form. It is this particle formation that is important to the formation of the unique look, as well as the physical and mechanical characteristics, of the pressure-formed products. The water content is determined primarily by the resin, although the water content of the blend of resin and cellulose can be modified by the addition of more water, or more cellulosic material, to produce the desired biocomposite particulate material.

Upon combining the resin, which is at a pH of about 10–14, with the cellulose, e.g., paper, the pH generally drops by at least about 1 pH unit, preferably to less than about 11, more preferably to less than about 10, and typically to a range of about 7–10. Although the inventors do not wish to be held to any particular theory, it is believed that the alkaline resin causes the protein molecules to hydrolyze and open, i.e., unfold. As the cellulose becomes intermingled with the protein molecules and the pH lowers, a linking between the cellulose and protein occurs, which is believed to occur through both mechanical and chemical interactions. This is believed to be a significant contributing factor to the internal bond strength within the particles.

Generally, the desired particulate material can be obtained by combining, i.e., blending or mixing, the legume-based resin and cellulosic material in a ratio of about 5 parts resin to about 1 part cellulose by weight. Preferably, however, an amount of resin and cellulose are combined such that, on a dry weight basis, the ratio of cellulose to resin solids, e.g., paper to soy flour, is about 0.8:1.0 to about 1.5:1.0, preferably about 1.0:1.0 to about 1.3:1.0, as illustrated by Example 4. The blending time can vary depending on the moisture content of the blend and the particle size desired. Typically, however, the particles are formed from the agglomerated mass in less than about 10 minutes.

Typically, the formation of the discrete particles also involves blending under shearing conditions to form a uniform mixture of the cellulosic material and the resin, which initially agglomerates into one large ball and then under the shearing forces breaks into individual, i.e., discrete, particles. Thus, the use of a high shear mixer is preferred, although other mixers, such as ribbon mixers and batch-type mixers, may be able to produce the desired particles, i.e., the irregularly shaped, tacky, balls referred to herein as the high moisture-content particles, under certain conditions. In particularly preferred embodiments, the mixer used to prepare the resin has paddies, shear bars, and chopper blades. A continuous feed mixer, such as a ribbon blender, may also be used to advantage to continuously blend each separately colored batch of feedstock. Appropriate proportioning controls are required to assure the proper compositions of the feedstock ingredients.

Once prepared, each of the separate batches of high moisture-content particles can be stored for up to about 12 hours until combined at stage 4, although it is desirable to combine them almost immediately upon formation. The separate colorized batches are combined or admixed at stage 4 in various prescribed proportions to provide a desired particulate material mixture that will yield a reproducible "chaotic" color pattern in the finished product. Three batches are shown in FIG. 3. Each batch contains a single monochromatic colorant. More or less batches of the same or different volumes may be mixed as necessary to obtain the proportions required to achieve a desired type and color of board stock. The color pattern ensuing in the derived board stock is entirely determined by the relative proportions of each of the particulate material batches in the admixture. For example, to provide a board stock product that virtually duplicates the appearance of natural "red granite," separate red, black, and white batches are prepared. The individual white, red, and black batch stocks are then mixed in weight percentage ratios of 25:37.5:37.5 to form the material used to form a pressure-formed product in stage 5. For "green granite," a 50:50 mixture of green and black particulate material is used. For "black granite," only black particulate material is used.

Mixing of the batches of colored particulate material can be carried out in a ribbon blender, a screw mixer, a tumble mixer, or any other means typically used in blending particulate material streams, e.g., flee-flowing solids. Preferably, a ribbon blender is used to form a generally uniform distribution of the differently colored particles. It is significant to note that there is not discernible color transfer from one particle to another during this blending process. This is at least because stable colorants are chosen such that they do not significantly bleed under these blending conditions or the subsequent processing conditions. Typically, this blending process of stage 4 does not significantly alter the particle size of the particulate material; however, the mechanical mixing process can reduce the size of large particles and break up aggregates of particles. This homogenized mixture is then typically screened to remove any remaining large clumps or aggregates of material that may have formed in the mixing and blending processes of stages 3 and 4. These clumps can be broken apart into smaller particles or discarded as deemed appropriate. Preferably, a screening device having a mesh size of 0.5 inch (1.3 cm) or smaller is used. Typically, a vibrating angled diamond screen having a 0.38 inch (0.95 cm) screen size is used.

Upon blending the colored batches at stage 4, a mixture of relatively dry-feeling or semi-dry feeling ball-shaped particles is obtained, although the particles contain a large amount of water, e.g., about 55–75% total water content. Although the consistency of the mixture could be referred to as being similar to coleslaw in that coleslaw contains "wet" particles, the consistency is more like a flocculant, and is significantly different from the aqueous slurries or adhesive-coated paper flakes that are prepared in most conventional recycled newsprint processes.

This admixture of differently colored particulate materials is preferably subjected to a drying step, wherein it is partially dried for a sufficient amount of time and at a sufficient temperature to reduce the moisture content to less than about 20%, preferably to less than about 15%, and more preferably to less than about 12%, based on the total weight of the particulate material. While a small quantity of moisture is generally necessary to permit the reaction of the resin with the fibrous cellulose and promote preferential bonding, extraneous water hampers later curing and can increase production costs. Although advantage is achieved by drying the combined colored batches of particulate material, this is not necessarily a requirement. That is, each batch can be partially dried prior to mixing them together.

Drying of the high moisture-content biocomposite particles can be achieved using any of a variety of energy sources, i.e., microwave energy, electromagnetic radio frequency energy, indirect infrared radiation, solar energy, or thermal energy, for a sufficient period of time to reduce the moisture content to the desired level. Preferably, the admixed particulate material of stage 4 is dried with air before being pressure-formed at stage 5. This can be accomplished, for example, by passing dry heated air through a layer of the particulate material supported by an open metal mesh belt. Although an air temperature of about 140°–180° F. (60°–82° C.) can be used to dry the particulate material, it is advantageous to use a slightly higher temperature, i.e., a temperature of about 175°–375° F. (79°–191° C.), and even as high as 500°–1000° F. (260°–538° C.). The surface temperature of the particles should not be so high, however, that the particles are scorched. That is, the temperature of the particles themselves should not exceed 210° F. (99° C.), although the air temperature may be significantly higher.

The residence time of the particles at the elevated temperature, i.e., the exposure time, is typically no greater than about 30 minutes, preferably it is about 10–20 minutes. The drying process should be sufficiently gradual, however, so that case hardening does not occur, wherein a moisture-impervious shell forms at the surface of the particles and traps moisture within the particles. Slow drying also allows more uniform drying of both large and small particles in the mixture. If a belt dryer is used, a total heated zone residence time of about 5–15 minutes for any individual particle is appropriate for an air temperature of about 200°–260° F. (93°–127° C.). The material is cooled prior to transfer to storage bins or to the next stages of the process. Once dried, the particulate material is significantly reduced in volume and appears as relatively hard, colored, solid particles of irregular shape with numerous rigid protruberances. In this form, the particulate material is very stable, i.e., it has an indefinite shelf life.

The reduction in the moisture content of the high moisture-content biocomposite particulate material permits a more rapid heating in the molding press, without creating significant quantities of steam or liquid. For example, a cured one-inch thick board can be formed during the hot press step of FIG. 3 upon applying 300–550 psi to the pre-dried feedstock with press platens held at 280°–320° F. over a period 5–30 minutes. Without pre-drying the particulate material, several additional minutes would be required with consequent greater energy usage. Furthermore, unless the particulate material is pre-dried, a "skin effect" can occur which tends to harden and seal the outer surfaces of the board stock and prevent the release of internal moisture, thereby causing blow-outs in the material. Edges may also char or become brittle to the point where additional mechanical processing is required to remove the unusable edges. Drying the particulate material, preferably with hot air, is therefore desired for a production process which incorporates conventional radiant heating or thermal curing equipment. Regardless of the compacting and curing process, however, drying the particulate material with air provides advantages to the overall process.

Alternatively, drying can be achieved by compressing or preforming the particles in the presence of heat, although this is not preferred because of the danger of causing blow-outs as discussed above. Final water removal may occur at the "hot press" step or stage 5 of FIG. 3 (or in the second roller compression step of stage 5 in the continuous extrusion process of FIG. 4).

At stage 5, the pressure-formed biocomposite material is produced in one method by compressing and curing the dry particulate material at an elevated pressure and temperature in a hot press. As used herein, "elevated" refers to temperatures and pressures above ambient conditions, i.e., room temperature and atmospheric pressure. The press may be either closed or open as in a caul or screen system, and the material may be pressed to stops or thickness, or pressure. If an open system is used, cold pre-pressing may be necessary for handling purposes. Alternatively, the particulate material can be roll pressed, reference FIG. 4, or extruded in a screw extruder, reference FIG. 5. Preferably, the material is compacted and heated in a one-step pressing operation to compress and further cure the particulate material.

Prior to compressing the particulate material, it is preferably and advantageously coated with a secondary thermosetting binder, i.e., an aromatic isocyanate, a sizing agent for water repellency, or a combination thereof. This can be accomplished by blending the dry biocomposite particles with the secondary thermosetting binder and/or sizing agent using a blender, such as a continuous or batch-type ribbon blender or a batch-type or continuous drum blender and coating, preferably spray coating using high pressure pumps, air atomizers, mechanical atomizers (e.g., a spinning disc atomizer), or a combination thereof. The secondary thermosetting binder interacts with the dried particles containing a protein-based resin that has been at least partially cured in the drying step of the process. This creates a dual resin system, i.e., a partially cured protein-based resin and an isocyanate resin, which is believed to provide greater advantage than either used alone.

Final curing during the hot press step of FIG. 3 may be achieved in a thermal, microwave, or radio frequency heated environment. Although such heating appliances are reasonably tolerant of moisture, energy requirements are reduced if unnecessary moisture is first removed as discussed above. Typical press pressures are about 200–3000 psi, preferably about 300–1000 psi, and more preferably about 500–600 psi. Although the pressure can be applied in a progressive manner, typically it is more efficient to simply apply a constant pressure for a specific period of time. For heated platen systems, the platen temperature during the pressure phase is preferably about 250°–340° F. (121°–171° C.), while the pressure is preferably about 450–750 psi. Typical values are 500 psi and 320° F. (160° C.). It is to be appreciated that the compacted particulate material can either be alternately heated and compressed or simultaneously heated and compressed.

The duration of the final cure exposure and applied thermal energy are selected in relation to the thickness and desired density of the board stock being prepared. For a nominal board stock of 1 inch thickness, an exposure time in the range of 3 to 5 minutes and 2 to 5 kilowatts per square foot at microwave frequencies up to 2.5 GHz produces suitable board stock. Although higher frequency microwaves may provide certain advantages, most commercial grade ovens operate at lower RF frequencies of 13.6, 27, 44, and 100 MHz. The lower RF frequencies are equally effective to obtain final curing. Using an electrically heated thermal platen press, an exposure time of about 10 minutes and 10–15 watts per square inch at 510 psi and 320° F. (160° C.) produces suitable board stock. A thermally heated platen press is particularly advantageous at least because it is economical.

Figure 5:
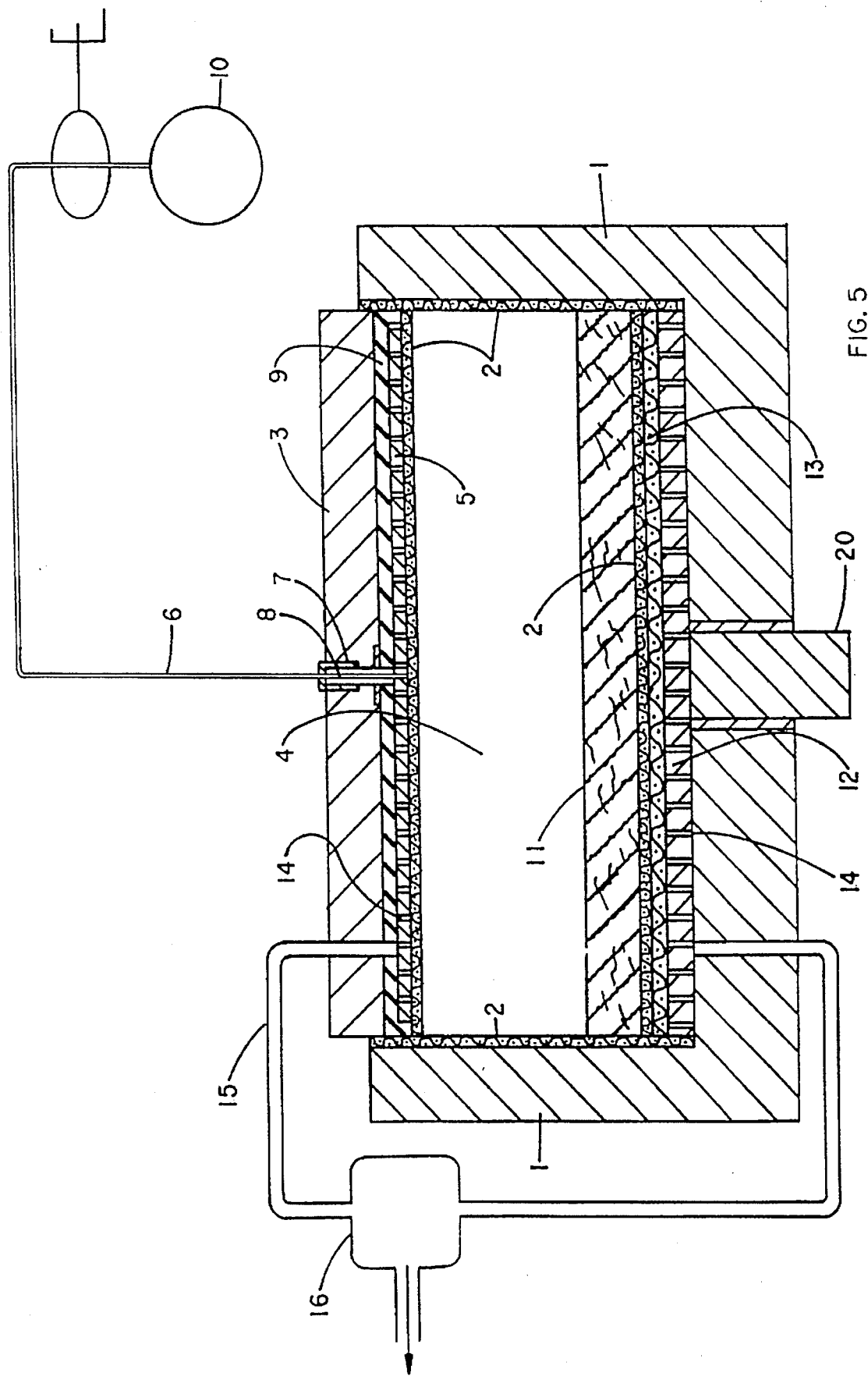
FIG. 5 is a schematic of a press.

Depending upon the pressure-formed product being prepared, a suitable oven or heated press is selected that is capable of compacting the particulate material to the desired size and providing a preferred throughput rate and energy consumption. The particular heated, pour batch molding press or "hot press" used in the process of FIG. 3 is shown at FIG. 5 in cross-section view. This heated molding press is suitable for hot pressing a single piece of board stock in the form of panels.

The body of the press mold is constructed of suitable heavy metal side and bottom walls 1. The walls 1 must be capable of withstanding the maximum molding pressure, and may or may not be lined with a porous member 2 to facilitate removal of extracted liquid, such as a screen, although this is not necessary. A movable top wall or compression plate 3 is provided along the top of the mold and is coupled to hydraulic means (not shown for convenience and clarity, but similar to the piston 20 described below) for directing the plate 3 to compress any feedstock material contained in the mold cavity 4.

The compression plate 3 includes a heated platen, which could be heated electrically or by steam or hot oil, or an RF or microwave plate electrode 5 which is connected to a suitable coaxial cable, waveguide, or electric wire 6. If RF or microwave energy are used, this coaxial cable or waveguide 6 is fed through a connector 7 from an RF or microwave generator 10. Also, the center conductor 8 (for RF or microwave energy) of the cable 6 passes through an electrical and thermal insulator plate 9 which separates the compression plate 3 from the electrode 5. Any substitute plate 5 should be capable of providing adequate heating to the dry particulate material.

Once the particulate material is compressed, heated, and cured to a final form as shown at 11, the material is extracted from the mold cavity 4 via the piston 20. The piston 20 is secured to a plate 12 along the bottom wall 1 of the mold. An additional (optional) porous member 13 may be placed below the member 2 and between the formed board stock 11 and the plate 12 to facilitate removal of released moisture, although predrying the particulate material is preferred to avoid the release of large amounts of water during this compression process. Either or both the bottom and top plates 12 and 5 may also contain an array of holes or channels 14 to permit the extraction of released moisture via insulating tubing 15 and a vacuum or other suitable suction pump 16. Again this is not necessary when the preferred dry particulate material is used.

With attention next directed to the extrusion process of FIG. 4, a generalized block diagram is shown of a continuous production process, rather than a batch process. Such a process and related production equipment can be constructed to provide board stock thicknesses varying from 0.125 inch (0.318 cm) to 2 inch (5.08 cm) thickness and would typically include an extrusion molder and a continuous feed oven or heating assembly. The configuration of a screw type extrusion apparatus 30 which could be used in the extrusion process is shown at FIG. 6.

With the exception of the final stage 5, each of the process stages of FIGS. 3 and 4 are the same, use comparable equipment and generally follow the procedures outlined above. That is and as in FIG. 3, a mixer is provided at stage 2 to receive appropriate solids and liquids from the raw material storage hoppers or liquid supply lines of stage 1. Motorized paddles or augers mix the separate cellulosic material and adhesive binder ingredients to a preferred consistency before transferring the ingredient mixtures to a mixing station at stage 3 for preparing each of the colorized particulate material batches.

In lieu of separate mixing stations at stages 2 and 3, a single mixer may be provided that includes a hopper. The hopper can contain a suitable supply of shredded cellulosic material. The hopper may also include a shredder mechanism for final shredding of the cellulosic material to an appropriate particulate size or shredding an additive pulp stock mixed with the base pulp stock. Once appropriate quantities of the resin and cellulosic material are admitted to the mixer, the materials are blended with the colorant and any additional additives, such as strengthening fibers, etc., are admixed.

The batches of monochromatic colored particulate material are next admixed at stage 4 at either a different mixer station or combined using the mixer of stage 3. The produced mixture is next fed through a screw drive extruder 30, such as shown at FIG. 6. The feedstock is particularly received at a material intake 32 and lower lying screw 34, which is driven by a drive system 35, the feedstock is progressively compressed, extraneous liquids are removed and the feedstock is shaped by forcing the feedstock through an appropriately configured extrusion die 36. The shape of the die orifice 38 can be varied as desired. For a board stock, a wide, shallow height rectangular orifice 38 is used. The temperature of the particulate material along the path of the screw 34 can be varied with provided heaters which surround the screw 34 and control signals applied at temperature control lines 40.

Upon exiting the extrusion die 36, the extruded material is typically admitted to a sequential arrangement of shaping rollers, such as roll formers or pinch rollers, which may include or be separated by intervening RF, microwave, or thermal heating appliances. The particulate material is progressively compressed as it is further heated. Final compression and forming occurs at the outboard section of shaping rollers. Residual moisture and vapor is bled off at each roller section prior to the shaped particulate material being final cured. Final curing can occur in a larger oven appliance which may surround the rollers or at a separate oven appliance which cures the formed particulate material to proper composition and dryness.

An equilibrating process, such as a post-curing or kiln drying process, may be incorporated into either of the processes of FIGS. 3 and 4 for acclimating the pressure-formed material to the ambient environment. In this way, the internal stresses resulting from pressure-forming can be gradually relieved and the entire volume of material allowed to come to equilibrium with ambient conditions. Whether the particulate material is formed by compression at FIGS. 3 and 5 or extrusion at FIGS. 4 and 6, it typically will retain less than 20%, and preferably less than 12% moisture.

An equilibrating process can be incorporated into either of the processes of FIGS. 3 and 4 for acclimating the pressure-formed material to the ambient environment. In this way, the internal stresses resulting from pressure forming can be gradually relieved and the entire volume of material allowed to come to equilibrium with ambient conditions. This equilibrating can either be accomplished by post-conditioning or kilning.

In post-conditioning, the panels are surface-planed immediately after pressing while they are still hot. The planed panels are stacked, i.e., piled one on top of another, while still hot and covered with an insulating counter weight flat panel material. The panels are stored in this fashion for at least about one week prior to sizing and finishing.

Kilning, i.e., kiln conditioning, is typically performed over 6 to 24 hours at an oven temperature of about 130°–210° F. (54°–99° C.), preferably about 150°–180° F. (65°–82° C.), with humidity levels up to about 75% relative humidity. The board stock material is typically constrained in a horizontal position during this conditioning process. The oven parameters are then gradually reduced to ambient conditions over several days to several weeks. Once dried, the pressure-formed material is preferably stored in a controlled humidity environment to maintain 6–8% moisture in order to enhance long-term dimensional stability. Kilning is typically not used in the process in which the secondary thermosetting resin, e.g., aromatic isocyanate, is used.

At the finishing stage, the pressure-formed product is surface finished, sized, and final shaped according to various market requirements by sanding, planing, sawing, shaping or other appropriate machining. The surface may also be coated or impregnated with preferred sealants, lacquers, varnishes, or the like. By bonding individual board stock components together, complex shapes and assemblies can be formed. Composites with other materials can also be obtained, such as by inlay. Seamed assemblies preferably are formed from stock prepared from common color batches to minimize any color differentiation.

A desirable attribute of the board stock produced by either of the processes of FIGS. 3 or 4 is that the material is relatively dense and thus can be finished to form relatively smooth edges and surfaces. Correspondingly, the edges accommodate conventional finger, or butt jointing and other jointing techniques to enable the production of larger, complex pieces from multiple smaller pieces. Also, because of the unique homogeneous color patterns exhibited throughout an entire volume of the produced stock, essentially seamless joints are obtained. Complex shapes, such as corner molding, contours and orthogonal jointed corners can also be formed with invisible seams at the juncture of two pieces of the same material.

A further attribute of derived board stocks is that compositional or inlaid board stock can be fabricated, using the batch processing method. In such instances and for the process of FIG. 3, separately prepared inlay members, such as commemorative plates, name tags or the like, and which can comprise almost any organic material (e.g., wood or plastics), or inorganic material (e.g., metal) can be inserted into the press mold prior to stage 5. Once the feedstock is added and compressed during the molding process, it forms around and in intimate contact with the inlay material. Upon final curing, a strong contact and bond is made between the inlay and board, and the inlay becomes an integral part of the resulting board stock.

Still another attribute of the invention and using the process and equipment of FIGS. 3 and 5 is the ability to machine the upper and/or lower plates either in cameo or intaglio with a desired figure or shape. When the particulate material is pressed in the mold, the board stock will retain an image of the pattern provided in the mold plate either intaglio or cameo, depending upon whether the mold plate pattern is raised or inset. Upon curing the raw product or board stock, the pattern is retained in free detail.

The following examples are offered to further illustrate the various specific and preferred embodiments and techniques. It should be understood, however, that many variations and modifications may be made while remaining within the spirit and scope of the present invention. As used in the examples, and elsewhere herein, percentages are weight percentages unless otherwise indicated.

EXPERIMENTAL EXAMPLES

EXAMPLE 1

Process for Production of Rigid Biocomposite Material

Table I, below, summarizes a preferred process sequence and recipe for the preparation of a single monochromatic batch of feedstock through stages 2 and 3 described above. This process and recipe are referred to as "A" in the following examples.

TABLE I

Single Colorant Particulate Material Preparation Process A

| | | Ingredient | Amount (pounds) |
|---|---|---|---|
| Step 1: | Combine | Water (60–70° F.) | 175 |
| | | Ground soybean | 97 |
| | | Pine oil | 3 |
| | Mix 3 minutes or until smooth | | |
| Step 2: | Add | Water (60–70° F.) | 169 |
| | Mix 2 minutes or until smooth | | |
| Step 3: | Add | 25% Potassium or Sodium hydroxide solution | 14 |
| | Mix 1 minute | | |
| Step 4: | Add | 'N' brand sodium silicate | 25 |
| Step 5: | Add | Soy resin from steps 1–4 | 117 |
| | | Polyvinyl acetate | 24 |
| | Mix 1 minute | | |
| Step 6: | Add | H. B. Fuller RM-0255 wax emulsion | 8 |
| | Mix 1 minute | | |
| Step 7: | Add | H. B. Fuller WB-2523 ("FULLREZ") formaldehyde-based latex resin | 8 |
| | Mix 1 minute | | |
| Step 8: | Add | Desired metal oxide colorant | 1 |
| | Mix 1–2 minutes | | |
| Step 9: | Combine | Resin from steps 1–8 | 5 parts by weight (83% by weight) |
| | | Cellulose material | 1 part by weight (17% by weight) |
| | Mix until particulate material forms (2–10 minutes) | | |
| Step 10: | Dry the particulate material to a moisture content of about 12–15% | | |

Modest variations of the formulation of Table I has been shown to produce final pressure-formed materials, e.g., board or shaped stock or panels, with more stable or optimized mechanical properties. Tables II and III, below, have each been shown to produce pressure-formed panels with improved properties of hardness and moisture sensitivity.

TABLE II

Alternative Particulate Formulation

| Ingredient | % Wet-Weight |
|---|---|
| Water | 55.9 |
| Cellulose (paper) | 16.9 |
| Soy flour | 15.8 |
| Sodium silicate | 4.1 (50% in water) |
| Sodium hydroxide | 2.3 (50% in water) |
| Lime | 1.9 |
| Styrene-butadiene latex | 1.6 |
| Tint | 0.7 |
| Pine Oil | 0.5 |
| H. B. Fuller WB-2523 (FULLREZ) | 0.3 |
| TOTAL | 100.0 |

TABLE III

Particulate Formulation-Water Resistant

| Ingredient | % Wet-Weight |
|---|---|
| Water | 54.8 |
| Cellulose (paper) | 17.7 |
| Soy flour | 15.4 |
| Sodium silicate | 4.0 (50% in water) |
| Sodium hydroxide | 3.1 (45% in water) |
| Lime | 1.9 |
| Styrene-butadiene resin | 1.6 |
| Tint | 0.7 |
| Pine Oil | 0.5 |
| H. B. Fuller WB-2523 | 0.3 |
| TOTAL | 100.0 |

Table IV demonstrates comparable values of wood based products to measured values of pressure-formed samples of one-inch thickness, which were produced generally in accord with the above-listed mixtures (i.e., Process A and variations thereof listed in Tables II and III.

TABLE IV

Comparative Properties

| Property Measured | MOR (K PSI) | MOE (K PSI) | INTERNAL BOND (PSI) | JANKA HARDNESS (POUNDS) | 24-HR IMMERSION MOIST. ABS. (WT. %) |
|---|---|---|---|---|---|
| Representative Wood-Based Products | | | | | |
| Type 1 Particle Board ANSI A208.1 1-H-3 | 3.40 | 400 | 140 | 1500 | No specification (Typically 15–40%) |
| Type 2 Particle Board ANSI A208.1 2-H-2 | 3.40 | 400 | 300 | 1800 | No specification |
| Mat-formed Wood; High Density Particle Board | 2.4–7.5 | 350–1000 | 125–450 | — | 15–40% |
| Waferboard | 2.0–3.5 | 450–650 | 50–100 | 700–1000 | 10–30% |
| Oak | 12.20 | 2500 | — | 1138.00 | 21% |
| Pine | 11.60 | 1600 | — | 378 | 25% |
| Sample Boards from Compressed Particulate Material | 2.0–4.9 | 550–1300 | >250 | 3500–7200 | 14–40% |

TABLE V

Particulate Material Preparation Process B

| | | Ingredient | Amount (pounds) |
|---|---|---|---|
| Step 1: | Combine<br>Mix 1 minute | Water (60–70° F.)<br>Colorant<br>Pine Oil | 680<br>46<br>9 |
| Step 2: | Add slowly (ca. 20 min.)<br>Mix 1–2 minutes once completely added | H. B. Fuller PD512 (latex emulsion with PVA) | 71 |
| Step 3: | Add with mixing<br>Mix with chopping 2 minutes | Honeymead 90 pdi soy flour | 280 |
| Step 4: | Add with mixing<br>Mix with chopping 2 minutes | Water (60–70° F.) | 238 |
| Step 5: | Add with mixing<br>Mix with chopping 2 minutes | Lime water solution (50 lbs. in 13 gallons water) | 103 |
| Step 6: | Add with mixing<br>Mix with chopping 5 minutes | 45% Potassium hydroxide solution | 33 |
| Step 7: | Add with mixing<br>Mix with chopping 2 minutes | 'N' brand sodium silicate | 72 |
| Step 8: | Add with mixing<br>Mix with chopping 2 minutes | H. B. Fuller WB-2523 ("FULLREZ") | 5 |
| Step 9: | Add | Hammer-milled nontreated inked newspaper | 330 |
| | Mix until particulate material forms (6–10 minutes) | | |
| Step 10: | Combine separate batches of colored particulate material prepared in steps 1–9 | | |
| Step 11: | Dry the particulate material to a moisture content of about 10–15% (ca. 50 minutes) | | |

The materials used were obtained from the following suppliers: potassium hydroxide, Hawkins Chemical Distributors (Minneapolis, Minn.); lime, Mississippi Lime MR200 distributed by Hawkins Chemical Co.; aqueous dispersion of PVA and a latex emulsion (50–52.5% PVA), H. B. Fuller Company; "N" brand sodium silicate, Hawkins Chemical; pine oil, Union Camp Co. distributed by Hawkins Chemical Co.; 90 pdi Soy flour, Honeymead Co.

TABLE VI

Particulate Material Preparation Process B

| | | Ingredient | Amount (pounds) |
|---|---|---|---|
| Step 1: | Combine<br>Mix 1 minute | Water (60–70° F.)<br>Colorant<br>Pine Oil | 814<br>23<br>9 |
| Step 2: | Add with mixing<br>Mix with chopping 2 minutes | Honeymead 90 pdi soy flour | 280 |

TABLE VI-continued

Particulate Material Preparation Process B

| | | Ingredient | Amount (pounds) |
|---|---|---|---|
| Step 3: | Add with mixing Mix with chopping 2 minutes | Water (60–70° F.) | 193 |
| Step 4: | Add with mixing Mix with chopping 2 minutes | Lime water solution (50 lbs. in 26 gallons water) | 206 |
| Step 5: | Add with mixing Mix with chopping 5 minutes | 45% Potassium hydroxide solution | 33 |
| Step 6: | Add with mixing Mix with chopping 2 minutes | 'N' brand sodium silicate | 72 |
| Step 7: | Add with mixing Mix with chopping 2 minutes | H. B. Fuller WB-2523 ("FULLREZ") | 5 |
| Step 8: | Add | Hammer-milled nontreated inked newspaper | 340 |
| | Mix until particulate material forms (6–10 minutes) | | |
| Step 9: | Combine separate batches of colored particulate material prepared in steps 1–8 | | |
| Step 10: | Dry the particulate material to a moisture content of about 5–7% (ca. 50 minutes) | | |

The particulate material made by Process C is typically further blended with a wax emulsion and MDI for desired results.

EXAMPLE 2

The Effects of Water Content Of Soy Resins on Mechanical and Physical Properties of Panels The amount of water that is added to the soy-based resin may influence several factors in the production of pressure-formed panels. Some of these include adhesive viscosity, which determines the amount of paper particles covered by the resin, the depth of color of the dried particles, drying rates, and particle geometry. To determine the impact of varying the moisture content of the particulate material, six batches were produced using Process B adjusted proportionately to a laboratory scale (Aquasperse II liquid lamp black colorant obtained from Huls Inc., Piscataway, N.J. was used). The only item varied between the batches was the amount of water added. This produced wet particles with the specified target moisture contents. These moisture contents were 55%, 59%, 63%, 67%, 71%, and 75%. The viscosity of each resin mix was measured prior to the addition of paper. All batches were dried to approximately 11% moisture content prior to pressing.

Four test panels per moisture content were pressed on a 2 ft.×2 ft. laboratory hot press. Platen temperature was 315° F. (157° C.), panels were pressed at a constant 512 psi for a total press time of approximately 13.5 minutes. Press time varied due to slight fluctuations in mat moisture content prior to pressing. Target panel specific gravity was 1.30 coming out of the press.

Three of the four panels produced per moisture content level were used for mechanical and physical panel property testing. From each panel, five static bending and five water absorption/thickness swell samples were obtained. Hardness samples were taken from the ends of tested static bending specimens. All testing was done in accordance with ASTM D-1037, Standard Methods of Evaluating the Properties of Wood-Base Fiber and Particle Panel Materials. Descriptive statistics were generated for all properties evaluated at the various target wet particle moisture contents.

The results of the viscosity measurements are as follows:

| | |
|---|---|
| 55% | 640,000 cps |
| 59% | 440,000 cps |
| 63% | 184,000 cps |
| 67% | 104,000 cps |
| 71% | 74,670 cps |
| 75% | 37,330 cps |

The viscosity directly impacts the coatability of the paper with the soy adhesives. The higher viscosity resins exhibited reduced coverage of the paper in the blending process. This could negatively affect the resulting panel properties. Conversely as the viscosity was lowered due to the addition of water the color of the blended material was enhanced. This enhanced color held through the process. The resulting pressed panels had different shades of black depending upon the wet particle moisture content. The drier particles were light in color while the high moisture-content particle produced very deep-black panels.

The viscosity also affects the bulk density of the final dried particles. As the viscosity was lowered due to increased water in the blend the bulk density of the particles also decreased. This is due to the increased shearing action that takes place in the blender at the lower viscosities. The average panel specific gravity by wet particle moisture content is as follows:

| | |
|---|---|
| 55% | 1.31 |
| 59% | 1.33 |
| 63% | 1.33 |
| 67% | 1.33 |
| 71% | 1.31 |
| 75% | 1.36 |

The results of mechanical testing are presented in Table VII. The panels made with the lowest wet particle moisture content exhibited the poorest strength and stiffness. This is due to the poor coverage of the soy resin on the paper particles. The numerous uncoated paper particles that are present in the final press panel do not provide significant strength or stiffness to the panel. This resulted in the 55% wet particle moisture content panels having poorer mechanical properties when compared to the other moisture contents. As the viscosity of the resin decreased, the coverage of the paper particles increased. However, there was no detectable difference in strength or stiffness between the wet particle moisture content ranges of 59% to 75%.

The hardness values are also presented in Table VII. As the bulk density of the dried particles decreased with the higher wet particle moisture content, the hardness values had a tendency to increase. This was caused by the finer particles that make up the panel being able to compress tighter than larger particles. This in turn made for a less porous, harder surface.

TABLE VII

Selected Mechanical Properties

| % Moisture Content of Particles Prior to Drying | MOR (psi) | MOE (psi) | Hardness (lbs) |
| --- | --- | --- | --- |
| 55 | 2,351 | 296,912 | 2,070 |
| 59 | 2,965 | 430,019 | 2,573 |
| 63 | 2,704 | 383,793 | 2,372 |
| 67 | 2,431 | 315,575 | 2,498 |
| 71 | 2,724 | 572,831 | 4,610 |
| 75 | 2,344 | 357,228 | 3,194 |

These values represent the mean of 15 test specimens.

The results of the physical property testing is presented in Table VIII. The panels manufactured with the 55% wet moisture content particles exhibited poor two-hour and twenty-four hour edge swell characteristics. This was due to the poor soy resin coverage previously mentioned. Furthermore, the results for the higher wet moisture content particles, 71% and 75%, exhibited extremely poor short term and long term edge swell characteristics. The twenty-four hour results for these two combinations were actually worse than indicated because the mean is based on the number of samples left to measure after twenty four hours of submersion. With the 71% test samples, eight fell apart in the water and with the 75% test samples, three fell apart in the water. Thus, with higher water content, the soy resin does not have sufficient bonding strength due to resin washout (i.e., dilution) to hold the panel together when the panels are immersed in water. The moisture content that exhibited the overall best two-hour and twenty-four hour edge swell values was 67%.

TABLE VIII

Selected Physical Properties

| % Moisture Content of Particles Prior to Drying | Percent Two-Hour Edge Swell | Percent Twenty-Four Hour Edge Swell |
| --- | --- | --- |
| 55 | 16.2 | 43.7 |
| 59 | 11.7 | 40.1 |
| 63 | 19.4 | 52.3 |
| 67 | 8.2 | 41.4 |
| 71 | 14.9 | 67.7 |
| 75 | 12.0 | 57.3 |

These values represent the mean of 15 test specimens.
Combination 71% had 8 samples fall apart and combination 75% had 3 samples fall apart during testing.

EXAMPLE 3

The Effects of Additional Paper on Physical and Mechanical Properties of Panels

The addition of extra paper and water to the recipe detailed in Process B (containing PVA) produced a less dense panel, while reducing the paper to resin ratio resulted in lighter panels and reduced panel cost per square foot. The amount of paper used was increased to 1 ½ times the amount normally used. The amount of water added was adjusted accordingly to keep the total water content in the batch at 61%. The total volume of the resin was adjusted to a laboratory scale. The particles were dried to 11%, and pressed in a 9 ¾ inch×4 inch mold. Only two panels were produced and were tested in the usual manner.

With the larger amount of paper, the paper did not coat as well as usual. Therefore, it was mixed longer to allow better coating. The particles were long and slender as opposed to the round shape that is usually produced. No noticeable differences were noted during pressing. Mechanical properties of the test panels showed little variation from standard panels. A slight decrease in water absorption properties was noted.

| Sample | MOE | MOR | Hardness | % Wt. Gain | % Vol. Swell |
| --- | --- | --- | --- | --- | --- |
| 1 | 453,379 | 3251 | 4157 | 19.83 | 22.65 |
| 2 | 528,765 | 3185 | 4056 | 18.34 | 21.84 |

Panel density only dropped slightly, from 1.3 down to 1.21. This could be the reason for poorer absorption properties. The dried particle density was about 0.97 compared to 0.93 for standard particles. Dried particle density was measured by volume displacement. A known mass of particles was put into a liquid that had a specific gravity of approximately 0.68 g/cc, and the volume the particles displaced was recorded. The reason for the lower density of the higher paper content particles is the longer mixing time and the smaller particle size. When round particles are produced with mostly a paper core, air pockets are trapped within the particles resulting in a less dense particle. When mixed longer, particles keep breaking down and air pockets get filled with resin, producing a more dense particle.

EXAMPLE 4

Evaluation of the Ratio of Paper to Soy Resin In the Production of Panels

The ratio of cellulose material to resin influences the mechanical and physical properties of composite panels. If there is not enough cellulose material within the composite panel, then the strength and stiffness will be lacking. On the other hand, if the cellulose material content is too high in the composite panel given the same resin loading, then the dimensional stability of the panel is lacking. Three half batches were made in the 60 cu. ft. mixer using the recipe detailed above in Process B (containing PVA). The ratio of paper to soy resin was varied for the three mixes. The ratios were as follows: 0.8:1.0, 1.3:1.0, and 1.5:1.0. The mixed material was dried to approximately 11% moisture content prior to pressing.

The panels were pressed in a 2 ft. by 2 ft. hot press. Platen temperature was 312° F. (156° C.) and a total press time of approximately 13.5 minutes. Press time was varied slightly to compensate for changes in furnish moisture content. Target specific gravity of the panels coming out of the press was 1.30. The panels were tested for strength, stiffness, hardness, and dimensional stability. Descriptive statistics were generated for the properties tested for each ratio.

The paper in the mixture prepared with the 1.5:1 paper to soy resin ratio did not coat well, whereas in the other mixtures, the paper coated well. As the paper ratio increased the bulk density of the dried particles decreased. No problems were encountered during pressing of the three different ratios.

The following is a summary of the mechanical properties of the panels produced in this study. The values listed represent the mean of 15 test specimens.

| Ratio paper/<br>soy adhesive | Modulus<br>of Elasticity (psi) | Modulus<br>of Rupture (psi) | Hardness<br>(lbs) |
| --- | --- | --- | --- |
| 0.8:1.0 | 263,958 | 2,225 | 2,241 |
| 1.3:1.0 | 529,553 | 3,014 | 3,525 |
| 1.5:1.0 | 525,240 | 2,909 | 3,384 |

The 0.8:1.0 ratio had significantly (P<0.05) lower strength, stiffness, and hardness due to lack of sufficient cellulosic material present within the composite panel. The cellulosic material provides internal support to the structure of the panel. The following is a summary of the physical properties of the panels produced in this study. The values listed represent the mean of 15 test specimens.

| Paper:Soy Resin<br>Ratio | 2-Hour<br>Edge Swell (%) | 24-Hour<br>Edge Swell (%) |
| --- | --- | --- |
| 0.8:1.0 | 7.29 | 37.26 |
| 1.3:1.0 | 10.32 | 35.87 |
| 1.5:1.0 | 22.02 | 55.48 |

The 1.5:1 ratio had significantly (P<0.05) higher two hour and twenty-four hour edge swell values than the other two combinations. The high amount of fiber present in this ratio did not receive adequate coating by the soy resin. Therefore, there was insufficient internal bond strength of the composite panel to prevent it from swelling considerably when submerged in water. There was no significant (P<0.05) difference between the two lower ratios used in this study.

This example shows that the ratio of paper to soy resin solids is important in the production of the panels according to the present invention. If the amount of paper is too low, the panels produced do not have sufficient strength and stiffness. If the amount of paper is too high, the panels do not have sufficient water resistance.

EXAMPLE 5

Evaluation of Protein Dispersion Index

This experiment was conducted to determine the level of soluble protein required in the soy flour. Soy flours with a pdi of 20 and 70 were evaluated. Batches of composite particles were manufactured in a laboratory 60 cu. ft. mixer using the recipe detailed in Process B (containing PVA) scaled down proportionally, but substituting the various pdi flours for the standard 90 pdi flour used. The particulate material was dried to approximately 11% moisture content prior to pressing.

Panels were pressed in a 2 ft. by 2 ft. hot press. Platen temperature was about 312° F. (156° C.). The total press time was about 13.5 minutes. Press time varied due to slight fluctuations in the moisture content of the particulate material. The target specific gravity of the panels coming out of the press was 1.30. The panels were tested for strength, stiffness, hardness, and dimensional stability. Descriptive statistics were generated for each property evaluated.

There were no problems encountered in either manufacturing of the composite particles or the pressing of the panels. The following is a summary of the mechanical properties of the panels produced in this study. The values are the mean of 15 test specimens.

| PDI of<br>Flour | Modulus of<br>Elasticity (psi) | Modulus of<br>Rupture (psi) | Hardness |
| --- | --- | --- | --- |
| 20 | 301,960 | 2,554 | 2,784 |
| 70 | 266,504 | 2,485 | 2,416 |

The mechanical properties of the panels produced in this study compared similarly to the mechanical properties obtained with the 90 pdi soy flour. There was no significant (P<0.05) difference in any of the mechanical properties tested between the 20 pdi and 70 pdi soy flour. The following is a summary of the physical properties of the panels produced in this study. The values listed are the mean of 15 test specimens.

| PDI of<br>Flour | 2-Hour<br>Edge Swell (%) | 24-Hour<br>Edge Swell (%) |
| --- | --- | --- |
| 20 | 5.95 | 30.65 |
| 70 | 4.84 | 24.01 |

The 20 pdi soy flour had significantly (P<0.05) higher twenty-four hour edge swell values than the 70 pdi soy flour. The effect of the protein providing the internal bonding strength that enhances the dimensional stability is evident. The 70 pdi soy flour exhibited dimensional stability values similar to the 90 pdi flour.

Thus, a wide range of protein dispersion index soy flours can be used to produce the composite particles of the present invention. The lower pdi flours produced panels with similar mechanical properties as panels produced using 90 pdi flour. However, for dimensional stability, higher pdi levels are required.

EXAMPLE 6

Evaluation of Coarse Soy Meal

It was the objective of this study to determine if a soy meal could be used in place of soy flour to produce the composite particles that make up the panels of the present invention. A 60 cu. ft. batch was manufactured in the laboratory blender using the recipe detailed in Process B (containing PVA) adjusted appropriately in volume. The only variation from the recipe was the substitution of soy meal for the soy flour. The particulate material was dried down to approximately 11% moisture content prior to pressing.

Panels were pressed in a 2 ft. by 2 ft. hot press. The press temperature was 312° F. Total press time was approximately 13.5 minutes. Press time may have varied due to slight fluctuations in moisture content of the particulate material. Target specific gravity out of the press was 1.30. The panels were tested for strength, stiffness, hardness, and dimensional stability. Descriptive statistics were generated for the properties tested.

After the addition of the soy meal to the mixture, the resin was noticeably thicker and more chunky than the usual recipe. After the paper was added there was no noticeable difference in the particles than the typical recipe used. No problems were encountered during the pressing of the panels. The average specific gravity of the panels manufactured was 1.25. The following is a summary of the data collected from test specimens. The values listed are the mean of 15 test specimens.

| Modulus of Elasticity (psi) | Modulus of Rupture (psi) | Hardness (lbs) | 2-Hour Edge Swell (%) |
|---|---|---|---|
| 523,823 | 2,266 | 3,067 | 31.80 |

The panels produced in this study had mechanical properties equivalent to panels manufactured with soy flour. However, twenty-four hour edge swell data could not be collected because the specimens disintegrated in the water.

EXAMPLE 7

Use of Isocyanate-Based Binder

Composite particles were prepared using recipe B (containing PVA) adjusted to a laboratory scale, and dried to 6.5% moisture. Some of these composite particles were pressure-formed as is, and others were coated with MDI (50 grams per 500 grams of particulate). Panels were pressed from this material using a temperature of 320° F. (160° C.), a pressure of 520 psi, for 6 minutes (Sample 1=uncoated particles and Sample 2=MDI-coated particles). Panels were pressed at this same temperature and pressure but for half the time, i.e., 3 minutes (Sample 3), or for 6 minutes at the same temperature and a pressure of 780 psi (Sample 4). The mechanical properties of these panels are listed below.

| Sample No. | Modulus of Elasticity (psi) | Modulus of Rupture (psi) | Hardness (lbs) |
|---|---|---|---|
| 1 | 444,000 | 3,126 | 3,019 |
| 2 | 691,000 | 4,911 | 4,330 |
| 3 | 291,000 | 1,576 | 571 |
| 4 | 797,000 | 6,027 | 4,447 |

These results indicate that the addition of MDI results in improved mechanical properties relative to the same particles pressed into panels without MDI. Furthermore, these results show that increased pressure and time of pressing results in improved mechanical properties as well.

EXAMPLE 8

Use of Isocyanate-Based Binder and Wax Emulsion

Composite particles were blended using the recipe detailed in Process C. The composite particles were dried in a belt dryer from approximately 61% moisture content to a 6% target moisture content. The particles were then blended with various levels of MDI and wax emulsion. The MDI used in this study was Rubinate 1840 from ICI Polyurethanes (West Deptford, N.J.). It is a urethane-based thermosetting clear, brown liquid with a viscosity below 500 cps at 77° F. (25° C.). The wax emulsion was 2100P from Hercules Incorporated (Minneapolis, Minn.). Particles (150 lbs) were blended with the various combinations of MDI and wax emulsion outlined below in a batch-type blender. Once the MDI and wax had been applied to the particles, the mixture was blended an additional two minutes to ensure even mixing and distribution of the components. The amounts of MDI used in this study were 3.5%, 5.0%, 7.5%, and 10%. The amounts of wax emulsion used in this study were 1.0% and 1.5%. Each MDI-loading was evaluated with both wax levels.

If the moisture content of the particles was below the target 6%, then additional make-up water was applied during the blending process. This was done to target the pre-press mat moisture content at approximately 8%. The blended material was transferred to a loader-hopper and an even mat was laid down in the forming box. The target thickness of the panels coming out of the press was 0.90 inches with a target density between 1.25 and 1.30. The pressing parameters used to achieve these targets were platen temperature of 325° F. (163° C.) at full pressure of 525 psi until the desired thickness was obtained. The pressure was then reduced sufficiently to hold the panels at the desired thickness. The total press time was 8.5 minutes: 8.0 minutes pressure cycle and 0.5 minutes degas cycle. Panels coming out of the press were hot stacked for at least twenty-four hours before cutting into test samples.

Two sets of comparison panels were manufactured. One set using the recipe detailed in Process B (containing the PVA), and the other set using particles from this same recipe (containing PVA) and then blended with 5% MDI resin. These comparison panels were pressed using the same parameters outlined above.

From the pressed panels, five were randomly selected to test for mechanical and physical panel properties. From the selected panels five static bending samples were cut to determine strength and stiffness. Also, five water absorption and thickness swell samples were cut from three of the selected MDI/wax panels and five of the latex and latex/MDI panels. Testing was done in accordance with procedures set by ASTM Standard D-1037, Standard Methods of Evaluating the Properties of Wood-Based Fiber and Particle Panel Materials.

Descriptive statistics were generated for each combination of resin loading, wax loading, and property tested. The data was analyzed using classical statistical techniques for significant differences between groups for the various properties tested.

While moisture content of wood-based materials is a concern in the manufacture of composite panels, companies typically try to run as dry as economically feasible to ensure fast press times and increased throughput of the mills. However, the moisture content of the particles before and after blending is important in the manufacture of panels when using MDI resin. The moisture content of the composite particles coming out of the dyer should preferably be in the range of 6% to 7%. This is needed to ensure that the post blending moisture content of the particles is very close to 8% before pressing. If the moisture content of the particles is low, compaction of the mat in the press is inadequate because the panel can not reach either the target thickness or target specific gravity. This produces panels with very porous surfaces. If the moisture content is high, then the excess water in the panel is converted into large mounts of steam under the pressing conditions of pressure and heat and causes numerous blow-outs of the panels coming out of the press. Therefore, using particles with either too low or too high of a moisture content during pressing with MDI is undesirable.

The results of the mechanical property testing are presented in Table IX. The combination containing just the soy adhesive with the PVA/latex had significantly (P<0.05) lower modulus of rupture (strength) than the combinations blended with MDI adhesive. There was no significant (P<0.05) differences detected in strength due to increasing MDI levels. However, there was a general trend: as the MDI addition levels increased, the strength also increased.

The combination containing just the soy resin with the PVA/latex had significantly (P<0.05) lower modulus of elasticity (stiffness) than the combinations blended with the MDI. As with the strength, there was no significant (P<0.05) differences detected in stiffness due to increasing MDI levels. However, the same trend was present: as the MDI addition rate increased, the stiffness also increased.

The strength and stiffness of the panels manufactured using MDI are substantially improved over the recipe that used the PVA/latex without MDI. The panels produced in this study with MDI exhibit strength and stiffness properties that are equivalent or better than high density particle board of the type used in the manufacture of commercial and residential furniture.

The increase in strength and stiffness due to increasing rates of MDI will allow the biocomposites to be tailored to desired strength and stiffness properties for specific end uses. The strength and stiffness of production panels using the addition rates of MDI from this study would tend to be higher given a slightly higher target specific gravity of 1.3 and less variability that is associated with a continuous system versus a batch system.

The results of the physical property testing is presented in Table X. The panels produced from just the soy resin system containing the PVA/latex had significantly (P<0.05) higher edge swell and water absorption than the combinations manufactured with the MDI resin. There was no significant (P<0.05) differences in either edge swell or water absorption detected between combinations due to increasing MDI addition rates or between the two wax levels. No trends were detected as with the strength and stiffness. Only at the 3.5% addition rate was there any improvement in dimensional stability due to increasing wax addition from 1.0% to 1.5%. From the table we can see that the wax has taken the place of the PVA latex as the sizing agent in the panels without adversely affecting dimensional stability.

Unlike conventional pressing of wood-based composites where MDI addition rates can vary up to 20–30%, the panel making process of the present invention typically has an upper limit to the amount of MDI that can be added without causing adverse effects on the panels coming out on the press. In the process, the target specific gravity is extremely high, 1.3 to 2.0 times higher than conventional manufactured wood-based composite panels. As stated before, this high specific gravity is needed to ensure low porosity of the panel surfaces. However, these tight panels leave very little void-space where the excess MDI can squeeze into. During the pressing operation using particles blended with the high loading rate of 10% MDI all free void space in the panel was filled and with some panels the excess MDI squeezed out. By filling all the free void space within the panel there are no areas or avenues for the steam that is generated in the pressing operation and $CO_2$ formed during the isocyanate curing process to escape. This cause numerous blow-outs in the panels when they come out of the press, similar to what one would find if the moisture content of the particulate material was too high. This problem was not encountered during pressing of panels using the particles blended with the 7.5% addition rate. This suggests that the upper limit on MDI loading is about 10%.

Other conclusions that can be drawn from this study include: the press times using the recipe without PVA, but with the MDI/wax blending systems are substantially lower than the press times used making panels with the recipes containing PVA. Given the manufacturing process used in this example and desired properties, the upper limit of the amount of MDI that can be blended with the composite particles is about 10%, although this can be about 20% under other conditions. By varying the amount of MDI coated on the dry particles, the mechanical and physical properties of the resulting panels can be designed to meet specific uses. At loading of 5% or above of MDI, there is no substantial gain in the dimensional stability when the amount of wax emulsion used is increased from 1.0% to 1.5%.

TABLE VIII

Selected Mechanical Properties of Panels Manufactured With Various Combinations of Resins and Sizing Agents

| Panel Type | | Specific Gravity | Modulus of Rupture (psi) | Modulus of Elasticity (psi) |
|---|---|---|---|---|
| Latex Only | n | 25 | 25 | 25 |
| | mean | 1.23 | 2,809 | 411,513 |
| Latex/5.0% MDI | n | 23 | 25 | 25 |
| | mean | 1.33 | 4,737 | 547,861 |
| 3.5% MDI/ 1.0% Wax | n | 25 | 25 | 25 |
| | mean | 1.25 | 3,894 | 647,595 |
| 3.5% MDI/ 1.5% Wax | n | 30 | 29 | 30 |
| | mean | 1.26 | 3,871 | 576,761 |
| 5.0% MDI/ 1.0% Wax | n | 25 | 25 | 25 |
| | mean | 1.21 | 4,033 | 535,627 |
| 5.0% MDI/ 1.5% Wax | n | 20 | 20 | 20 |
| | mean | 1.25 | 4,369 | 645,858 |
| 7.5% MDI/ 1.0% Wax | n | 20 | 20 | 20 |
| | mean | 1.23 | 4,508 | 672,700 |
| 7.5% MDI/ 1.5% Wax | n | 25 | 25 | 25 |
| | mean | 1.20 | 4,208 | 672,043 |
| 10% MDI/ 1.0% Wax | n | 25 | 25 | 25 |
| | mean | 1.25 | 4,703 | 746,482 |
| 10% MDI/ 1.5% Wax | n | 20 | 20 | 20 |
| | mean | 1.28 | 4,744 | 719,268 |

TABLE IX

Selected Physical Properties of Panels Manufactured With Various Combinations of Resins and Sizing Agents

| Panel Type | | Specific Gravity | Twenty-Four Hour Percent Edge Swell | Twenty-Four Hour Percent Weight Gain |
|---|---|---|---|---|
| Latex Only | n | 18 | 18 | 18 |
| | mean | 1.25 | 40.6 | 30.9 |
| Latex/5.0% MDI | n | 24 | 24 | 24 |
| | mean | 1.28 | 10.3 | 9.6 |
| 3.5% MDI/ 1.0% Wax | n | 15 | 15 | 15 |
| | mean | 1.27 | 15.6 | 11.9 |
| 3.5% MDI/ 1.5% Wax | n | 15 | 15 | 15 |
| | mean | 1.29 | 12.6 | 9.7 |
| 5.0% MDI/ 1.0% Wax | n | 15 | 15 | 15 |
| | mean | 1.24 | 12.4 | 10.9 |
| 5.0% MDI/ 1.5% Wax | n | 15 | 15 | 15 |
| | mean | 1.27 | 11.8 | 9.5 |
| 7.5% MDI/ 1.0% Wax | n | 10 | 10 | 10 |
| | mean | 1.26 | 9.3 | 8.5 |
| 7.5% MDI/ 1.5% Wax | n | 15 | 15 | 15 |
| | mean | 1.27 | 9.3 | 8.5 |
| 10% MDI/ 1.0% Wax | n | 11 | 11 | 11 |
| | mean | 1.32 | 9.8 | 8.1 |
| 10% MDI/ 1.5% Wax | n | 15 | 15 | 15 |
| | mean | 1.31 | 10.4 | 8.1 |

EXAMPLE 9

Panels Made From Soy Flour and Lime

This study was conducted as a comparison to evaluate the use of lime and soy flour in the production of a soy resin. The recipe used to manufacture the soy resin was a combination of 8 kg lime, 148 kg water, and 49 kg 90 pdi soy flour, which was combined with 46 kg hammer milled nontreated inked newspaper. The material was dried to approximately 11% moisture content prior to pressing. Platen temperature was about 312° F. (156° C.). The total press time was about 13.5 minutes. Press time varied due to slight fluctuations in the moisture content of the particulate material. The target specific gravity of the panels coming out of the press was 1.30. The panels were tested for strength, stiffness, hardness, and dimensional stability. Descriptive statistics were generated for each property evaluated.

There were no problems encountered in either manufacturing of the composite particles of the pressing of the panels. The following is a summary of the mechanical and physical properties of the panels produced in this study. The values listed are the mean of 15 test specimens.

| Modulus of Elasticity (psi) | Modulus of Rupture (psi) | 2-Hour Edge Swell (%) |
|---|---|---|
| 217,559 | 1,080 | 16.82 |

The panels had considerably less strength and stiffness than panels made from composite particles manufactured using the typical soy resin recipe. The dimensional stability of the panels produced in this study were extremely poor. The test samples disintegrated in the water during testing. Therefore, 24-hour edge-swell data was unattainable. This simple recipe of lime, soy flour, and water produced particles that lack both internal bonding capabilities as well as particle to particle bonding capabilities.

EXAMPLE 10

Preparation of Biocomposite Material Using Pea Resin

The resin-based biocomposite particles of the present invention uses protein-derived systems. Although the most preferred protein is derived from soy flour, other legumes can be used, including a wide variety of beans and peas. Exemplary of this is pea flour, which was ground in a hammer mill from dried yellow split peas to a consistency finer than 325 mesh.

Particulate material was made using pea flour in place of soy flour in the recipe detailed in Process B (containing PVA) reduced to a laboratory scale. Four panels were pressed in a 2 ft. by 2 ft. hot press. Platen temperature was 312° F. (156° C.) and a total press time of approximately 13.5 minutes. Press times varied slightly to compensate for changes in particulate material moisture content. Target specific gravity coming out of the press was 1.3. The panels were tested for strength, stiffness, and dimensional stability. Descriptive statistics were generated for each property tested.

There were no noticeable difficulties encountered in using the pea flour in substitution of the soy flour during mixing of the composite particles. However, after the drier the particles had a noticeably lower bulk density than particles manufactured with the soy flour. The low bulk density of the composite particles caused some difficulty in pressing, and resulted in a greater degree of variation in density along and across the panels than when soy flour was used. This was most likely due to the fine grind of the pea flour. This problem could be corrected by adjusting the grinding parameters to produce the same mesh size flour as the currently used soy flour.

The following summarizes the mechanical properties obtained from the panels produced in this experiment. The numbers listed represent the mean of 15 test specimens.

| Modulus of Rupture (psi) | Modulus of Elasticity (psi) |
|---|---|
| 2,787 | 424,951 |

The strength and stiffness of the panels produced with pea flour were very similar to panels produced with soy flour. Typical strength and stiffness of panels produced using the recipe detailed in Process B with soy flour is 2,809 psi and stiffness is 411,513 psi (see Example 7).

The following summarizes the physical properties obtained from the panels produced with pea flour. The values listed are the mean of 8 test specimens.

| 2-Hour Edge Swell (%) | 24-Hour Edge Swell (%) |
|---|---|
| 24.5 | 54.2 |

The edge swell values are slightly higher than panels produced under the same conditions using soy flour. Typical twenty-four hour edge swell is 40.6% (see Example 7). This increase in edge swell values is believed to be due to the high variability of the panel density. With a more consistent density around the target of 1.3, the edge swell values of the panels made with pea flour should be very comparable to panels produced using soy flour, and are clearly suitable for interior use applications.

Test Methods

The following test methods were used to obtain the above-listed results. Typically, the samples were tested at their target in-service moisture content of approximately 7%. Test specimens were removed at random from the lot of material tested.

Static Bending (MOR & MOE)

The strength, i.e., modulus of rupture ("MOR"), and stiffness, i.e., modulus of elasticity ("MOE"), were evaluated using the static bending test detailed in ASTM:D1037-91, Sections 11–20. A number of 3-inch×10-inch test specimens were removed from each test panel, and placed in a universal testing machine. A span of 8 inches and a constant cross head speed was applied to the test specimens until failure. Load vs. deflection data was recorded and the MOR and MOE were calculated for each specimen and averaged for each condition tested.

Hardness

The hardness was determined using the method detailed in ASTM:D 1037-91, Sections 74–80. A number of 3-inch× 6-inch test specimens were removed from each test panel, and placed in a universal testing machine using appropriate fixtures. A modified Janka Ball (0.4375-inch diameter) was penetrated into the specimen at a constant rate to a deflection of 0.10 inch. The load vs. deflection data was recorded and the equivalent Janka Ball hardness values were calculated and averaged for each condition being tested.

Water Absorption and Thickness Swelling

The water absorption and thickness swelling test was conducted using the method detailed in ASTM:D1037-91, Sections 100–106. A number of 6-inch×6-inch test specimens were measured for original thickness and weight and then submerged horizontally under 1 inch of water. Changes in weight and thickness were measured after 2 hours and 24 hours. The changes in thickness and weight were calculated and averaged for each condition being tested.

Internal Bond

The internal bond testing was conducted using the test method detailed in ASTM: D1037-91, Sections 28–33. A number of 2-inch by 2-inch test speciments were removed from the test panels and glued to appropriate test fixtures. The glued-up sample was placed in a universal test machine and a constant load applied until failure. Maximum obtained load was recorded and corresponding internal bond values calculated.

Moisture Content and Density/Specific Gravity

The moisture content and specific gravity were determined using the method detailed in ASTM:D 1037, Sections 126–127. Specimens were obtained from the various test samples for static bending. The specimens were weighed and measured at their in-service moisture content of approximately 7% for density. These specimens were then oven-dried at 103° C. to practical equilibrium, weighed, and compared to the initial weight to determine actual moisture content.

Viscosity

Viscosity of various soy adhesive mixtures was measured using a Brookfield model DV-I+ viscometer. A number of 100-ml beaker samples of the soy adhesive in its form prior to the addition of cellulose was tested at 60°–70° F. (16°–21° C.) using a number 6 spindle. The resulting centipoise readings were recorded and averaged for each condition calculated.

Although the invention has been described with respect to various presently preferred mixtures and production equipment, it is to be appreciated that still other methods and mixtures may be suggested to those skilled in the art. Accordingly, it is contemplated that the foregoing description should be interpreted to include all those equivalent embodiments within the spirit and scope thereof.

What is claimed is:

1. A biocomposite particulate material comprising discrete fiber-reinforced protein-based particles having a moisture content of about 55–75% by weight and a particle size of no greater than about 0.5 inch; said discrete particles comprising an aqueous legume-based resin and fibrous cellulosic material, wherein the ratio of cellulose solids to resin solids is about 0.8:1.0 to about 1.5:1.0.

2. The biocomposite particulate material of claim 1 wherein the ratio of cellulose solids to resin solids is about 1.0:1.0 to about 1.3:1.0.

3. The biocomposite particulate material of claim 1 wherein the legume-based resin comprises a ground leguminous material having a protein dispersion index of about 20–100 pdi.

4. The biocomposite particulate material of claim 3 wherein the leguminous material has a protein dispersion index of about 70–100 pdi.

5. The biocomposite particulate material of claim 3 wherein the ground leguminous material is a pulse crop.

6. The biocomposite particulate material of claim 5 wherein the ground pulse crop is a ground soybean material.

7. The biocomposite particulate material of claim 6 wherein the ground soybean material is soy flour.

8. The biocomposite particulate material of claim 1 wherein the legume-based resin includes an amount of ground leguminous material effective to produce a resin having a viscosity of about 37,000–640,000 cps at 65° F.

9. The biocomposite particulate material of claim 8 wherein the leguminous material is present in the resin in an amount of about 15–40% by weight based on the total weight of the resin.

10. A biocomposite particulate material comprising discrete fiber-reinforced protein-based particles having a moisture content of less than about 20% by weight and a particle size of no greater than about 0.5 inch; said discrete particles comprising a legume-based resin and fibrous cellulosic material, wherein the ratio of cellulose solids to resin solids is about 0.8:1.0 to about 1.5:1.0.

11. The biocomposite particulate material of claim 10 wherein the ratio of cellulose solids to resin solids is about 1.0:1.0 to about 1.3:1.0.

12. The biocomposite particulate material of claim 11 wherein the moisture content of the discrete particles is about 6–18% by weight.

13. The biocomposite particulate material of claim 12 wherein the discrete particles are coated with a secondary thermosetting binder.

14. The biocomposite particulate material of claim 10 wherein the legume-based resin comprises a ground leguminous material having a protein dispersion index of about 20–100 pdi.

15. The biocomposite particulate material of claim 14 wherein the leguminous material has a protein dispersion index of about 70–100 pdi.

16. A rigid biocomposite pressure-formed material comprising fused discrete fiber-reinforced protein-based particles wherein said discrete particles prior to being fused have a moisture content of less than about 20% by weight and a particle size of no greater than about 0.5 inch, and comprise a legume-based resin and fibrous cellulosic material in a ratio of cellulose solids to resin solids of about 0.8:1.0 to about 1.5:1.0.

17. A method for preparing a biocomposite particulate material comprising discrete fiber-reinforced protein-based particles; said method comprising:
 (a) preparing an aqueous legume-based resin having a pH of about 10–14; and
 (b) combining a fibrous cellulosic material with the aqueous legume-based resin in an amount and manner effective to form discrete biocomposite particles having a moisture content of about 55–75% by weight, a particle size of no greater than about 0.5 inch, and a ratio of cellulose solids to resin solids of about 0.8:1.0 to 1.5:1.0.

18. A method of preparing a rigid pressure-formed biocomposite material comprising:
 (a) preparing an aqueous legume-based resin having a pH of about 10–14;
 (b) combining a fibrous cellulosic material with the aqueous legume-based resin in an amount and manner effective to form discrete biocomposite particles having a moisture content of about 55–75% by weight, a particle size of no greater than about 0.5 inch, and a ratio of cellulose solids to resin solids of about 0.8:1.0 to 1.5:1.0;
 (c) reducing the moisture content of the discrete biocomposite particles to less than about 20% by weight to form dry biocomposite particles; and
 (d) pressing the dry biocomposite particles under an elevated temperature and pressure for a time effective to fuse the particles into a rigid biocomposite pressure-formed material.

19. A biocomposite particulate material preparable by the method of claim 17.

20. A biocomposite pressure-formed material preparable by the method of claim 18.

* * * * *

UNITED STATES PATENT AND TRADEMARK OFFICE
CERTIFICATE OF CORRECTION

PATENT NO.: 5,635,123
DATED: 3 June 1997
INVENTOR(S): RIEBEL et al.

It is certified that error appears in the above-identified patent and that said Letters Patent is hereby corrected as shown below:

On the Cover Page

In the first column, at [75], after Carl Gruber, delete "Le Seur" and insert --LeSueur--.

Col. 2, line 6, delete "mount" and insert --amount--.

Col. 3, line 65, delete "are a photograph" and insert --are photographs--.

Col. 4, line 3, delete "of FIG 1" and insert --of FIGS 1a and 1b--.

Col. 4, lines 35-39, delete "FIG 1 is a photograph of the particulate material of the present invention, in a high moisture-content state and in a dry state, and FIG 2 is a photograph of the granular structure and stone-like appearance of a section of board stock prepared from the particulate material of FIG 1." and insert --FIG 1A is a photograph of the particulate material of the present invention in a high moisture-content state and FIG 1B is a photograph of the particulate material of the present invention in a dry state. FIG 2 is a photograph of the granular structure and stone-like appearance of a section of board stock prepared from the particulate material of FIGs 1A and 1B.--

Col. 9, line 40, delete "mount" and insert --amount--.

UNITED STATES PATENT AND TRADEMARK OFFICE
CERTIFICATE OF CORRECTION

PATENT NO.: 5,635,123
DATED: 3 June 1997
INVENTOR(S): RIEBEL et al.

It is certified that error appears in the above-identified patent and that said Letters Patent is hereby corrected as shown below:

Col. 11, line 31, delete "mount" and insert --amount--.

Col. 11, line 48, delete "mount" and insert --amount--.

Col. 12, line 59, delete "added 16" and insert --added to--.

Col. 17, line 38, delete "flee flowing" and insert --free flowing--.

Col. 22, line 48, delete "comers" and insert --corners--.

Col. 24, line 65, delete "III." and insert --III).--.

Col. 26, line 56, delete "Process B" and insert --Process C--.

Col. 27, line 4, delete "Process B" and insert --Process C--.

Col. 34, line 52, delete "mounts" and insert --amounts--.

Col. 40, line 14, delete "6-18%" and insert --6-8%--.

Signed and Sealed this

Twenty-fifth Day of August, 1998

Attest:

BRUCE LEHMAN

Attesting Officer

Commissioner of Patents and Trademarks